US008931216B2

(12) United States Patent

Gazda et al.

(10) Patent No.: US 8,931,216 B2
(45) Date of Patent: Jan. 13, 2015

(54) AUTOMATIC SLIDING DOOR SYSTEMS, APPARATUS AND METHODS

(71) Applicants: Mark Lawrence Gazda, Springfield, IL (US); James Michael Norris, Springfield, IL (US)

(72) Inventors: Mark Lawrence Gazda, Springfield, IL (US); James Michael Norris, Springfield, IL (US)

(73) Assignee: Propel Doors LLC, Chatham, IL (US)

( * ) Notice: Subject to any disclaimer, the term of this patent is extended or adjusted under 35 U.S.C. 154(b) by 0 days.

(21) Appl. No.: 13/935,122

(22) Filed: Jul. 3, 2013

(65) Prior Publication Data

US 2014/0041305 A1 Feb. 13, 2014

Related U.S. Application Data

(63) Continuation-in-part of application No. 13/313,643, filed on Dec. 7, 2011, now Pat. No. 8,544,215.

(60) Provisional application No. 61/667,499, filed on Jul. 3, 2012, provisional application No. 61/735,622, filed on Dec. 11, 2012.

(51) Int. Cl.

| | |
|---|---|
| ***E04B 1/346*** | (2006.01) |
| ***E05F 15/00*** | (2006.01) |
| ***F16M 13/02*** | (2006.01) |
| ***E05F 15/14*** | (2006.01) |
| ***E05D 15/06*** | (2006.01) |

(52) U.S. Cl.

CPC ................ *E05F 15/00* (2013.01); *F16M 13/02* (2013.01); *E05F 15/145* (2013.01); *E05F 15/142* (2013.01); *E05D 15/0656* (2013.01); *E05Y 2201/434* (2013.01); *E05Y 2201/656* (2013.01); *E05Y 2600/46* (2013.01); *E05Y 2900/132* (2013.01)

USPC .................................... 52/64; 49/360; 49/324

(58) Field of Classification Search

CPC ......... E05F 15/145; E05F 15/00; E05F 15/14; E05F 15/142; E04B 2/827; E05Y 2900/132; E05Y 2201/246

USPC ............ 49/360, 324; 52/64; 160/84.01, 84.08

See application file for complete search history.

(56) References Cited

U.S. PATENT DOCUMENTS

| | | | | |
|---|---|---|---|---|
| 3,073,383 | A * | 1/1963 | Crick | 160/193 |
| 4,133,364 | A * | 1/1979 | Smart | 160/199 |
| 5,577,348 | A * | 11/1996 | Keller | 49/317 |
| 6,289,643 | B1 * | 9/2001 | Bonar | 52/207 |
| 6,615,894 | B1 * | 9/2003 | McKeon | 160/1 |
| 6,791,461 | B2 * | 9/2004 | Oku et al. | 340/573.1 |
| 6,910,301 | B2 * | 6/2005 | Kalempa et al. | 49/368 |
| 7,845,386 | B2 * | 12/2010 | Coleman et al. | 160/199 |
| 8,307,877 | B1 * | 11/2012 | Lambridis et al. | 160/118 |
| 8,534,341 | B2 * | 9/2013 | Coleman et al. | 160/84.02 |
| 2002/0056236 | A1 * | 5/2002 | Kalempa et al. | 49/478.1 |
| 2002/0118113 | A1 * | 8/2002 | Oku et al. | 340/573.1 |

(Continued)

*Primary Examiner* — Mark Wendell

(74) *Attorney, Agent, or Firm* — Scherrer Patent & Trademark Law, P.C.; Stephen T. Scherrer; Monique A. Morneault

(57) ABSTRACT

The present invention relates to sliding door systems, apparatus and methods of using and making the same. Specifically, the present invention relates to systems for opening horizontally sliding doors on a structure, such as, for example, a barn, warehouse, hangar, or other building or structure. Moreover, the present invention relates to apparatuses for providing the automatic opening of sliding doors. In addition, methods of making and using the same are provided.

7 Claims, 22 Drawing Sheets

(56) References Cited

U.S. PATENT DOCUMENTS

2004/0206004 A1* 10/2004 Kalempa et al. ................ 49/370
2004/0231244 A2* 11/2004 Kalempa et al. ............. 49/478.1
2005/0110300 A1* 5/2005 Oxley et al. .................. 296/155
2006/0182574 A1* 8/2006 Maehara et al. .............. 414/509
2008/0105387 A1* 5/2008 Coleman et al. .............. 160/194
2009/0139146 A1* 6/2009 Houser et al. ................... 49/340
2011/0047876 A1* 3/2011 Houser et al. ..................... 49/70

* cited by examiner

FIG. 31
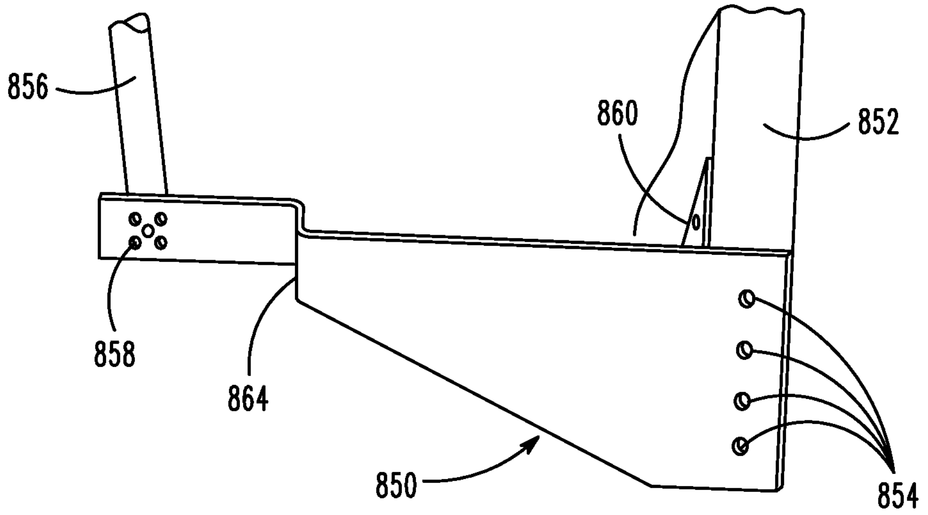
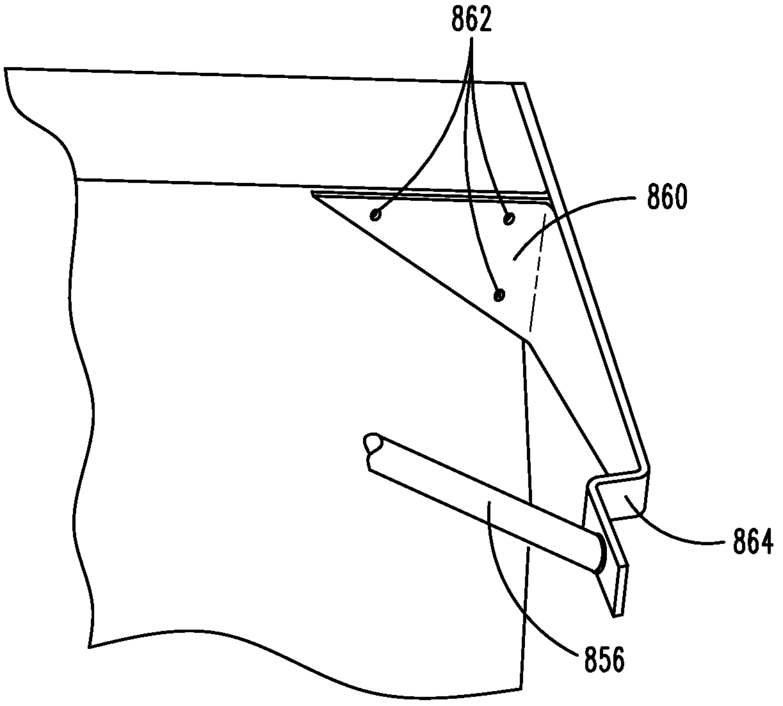
FIG. 32

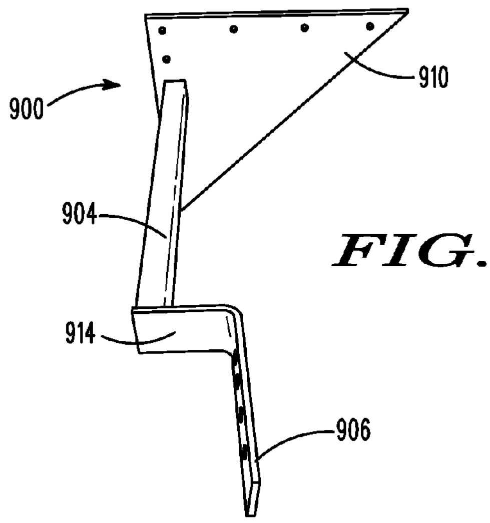
FIG. 35
FIG. 36A
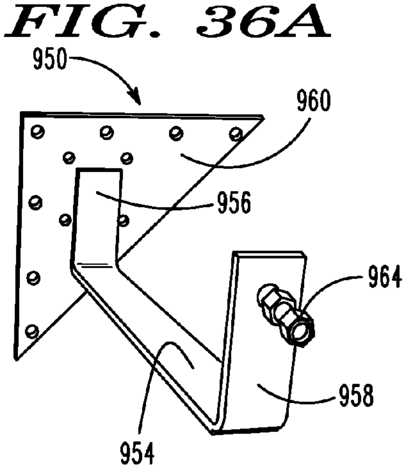
FIG. 36B
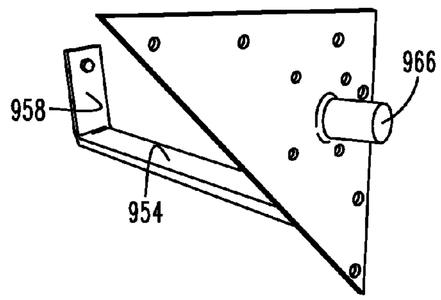
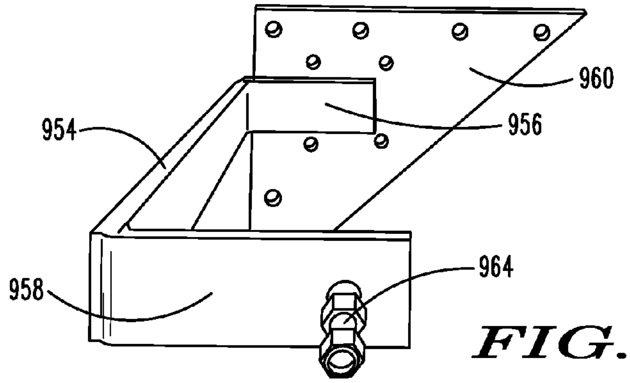
FIG. 36C

FIG. 37
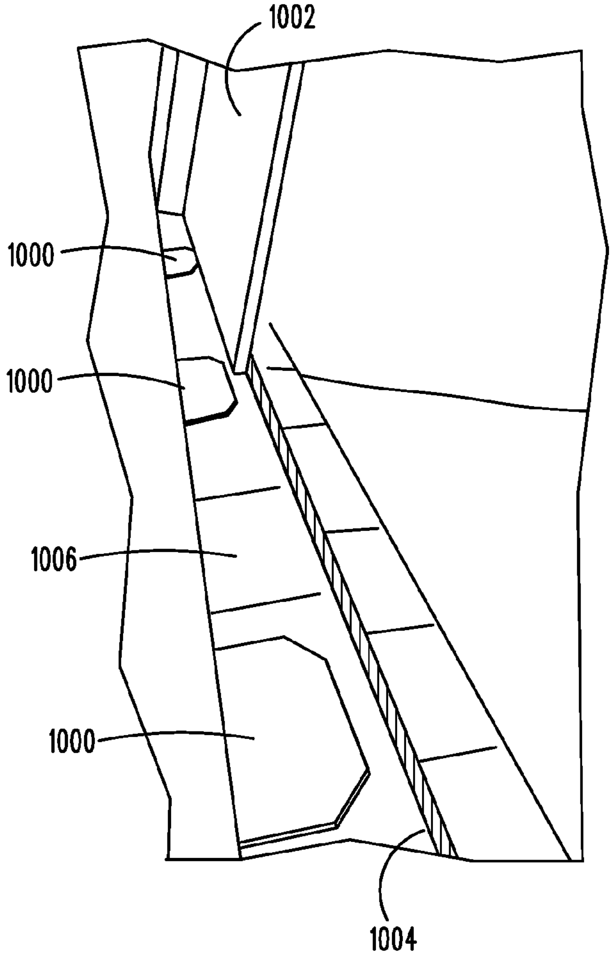
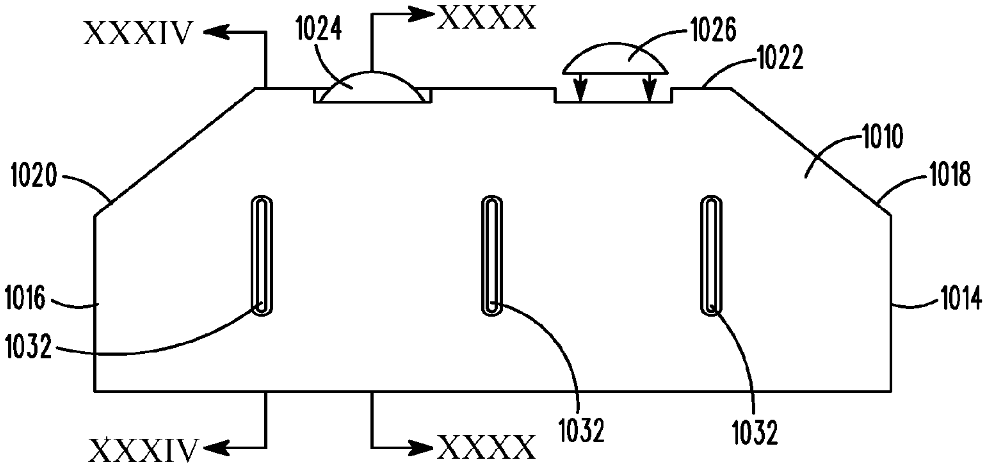
FIG. 38

AUTOMATIC SLIDING DOOR SYSTEMS, APPARATUS AND METHODS

The present invention claims priority under 35 U.S.C. §119 to U.S. Provisional Patent Application No. 61/667,499, entitled "Automatic Sliding Door Systems, Apparatus and Methods", filed Jul. 3, 2012 and to U.S. Provisional Patent Application No. 61/735,622, entitled "Automatic Sliding Door Systems, Apparatus and Methods", filed Dec. 11, 2012, and as a Continuation-In-Part application of U.S. patent application Ser. No. 13/313,643, entitled, "Automatic Door Systems, Apparatus and Methods", which claims priority under 35 U.S.C. §119 to U.S. Provisional Application No. 61/42,665, filed Dec. 7, 2010, 61/454,748, filed Mar. 21, 2011, and 61/509,498, filed Jul. 19, 2011, each of which is incorporated herein by reference in its entirety.

TECHNICAL FIELD

The present invention relates to sliding door systems, apparatus and methods of using and making the same. Specifically, the present invention relates to systems for opening horizontally sliding doors on a structure, such as, for example, a barn, warehouse, hangar, or other building or structure. Moreover, the present invention relates to apparatuses for providing the automatic opening of sliding doors. In addition, methods of making and using the same are provided.

BACKGROUND

It is, of course, generally known to automate the opening of doors. The use of an automatic overhead door for a garage, for example, has been known for many years. Generally, a torsion spring is typically used to provide a counterbalance for a garage door, such that opening the garage door vertically is relatively easy, even for an individual to handle manually. One or more tracks are typically provided for moving the door vertically to open and close the same. A motor is utilized whereby the motor pushes and/or pulls the garage door open or closed. It is further known to utilize either a hard-wired control system, such as a simple button, or a wireless control system, for engaging the motor to open and close the garage door.

However, use of an overhead door has significant disadvantages. First, depending on the size of the door to be moved, an adequate torsion spring must be used to provide the counterbalance. If a door is very large, the torsion spring must also be very large. The torsion spring requires maintenance to allow continued use thereof, and eventually the tension in the torsion spring may cause the spring to be damaged after a certain period of time, requiring replacement thereof.

In addition, the track typically utilized in an overhead door typically sits directly beneath the ceiling of the internal space, and frequently reduces the useable vertical height of the internal space. Specifically, the track typically hangs a distance from the ceiling, and the garage door is maintained on the track. The track or tracks, in many cases, hang low, especially if there is very little vertical clearance above the clearance height of the doorway, thereby reducing the useable vertical height of the space. In other words, the lower the track hangs from a ceiling, the shorter the equipment must be that is stored within the space. This may cause a particular problem if a machine, such as a vehicle or a piece of farm equipment, for example, sits fairly high or is very tall; the track of the overhead garage door may be in the way of the machine.

To solve some of these problems, horizontal sliding doors are utilized. Typically, horizontal sliding doors either hang from one or more tracks, or sit upon one or more tracks, or both. In some cases, the horizontal sliding door may be bifurcated, such that the two sliding door panels slide horizontally away from the center of the doorway, thereby exposing the doorway. Alternatively, a single sliding door panel may cover the entirety of the doorway, in which case the single sliding door panel is slid horizontally across the entirety of the door opening to expose the door opening.

Typically, the sliding door is disposed on an outside of the structure, such that opening the sliding door causes the sliding door to be disposed on an outside wall of the structure. To ensure that the sliding door does not get pushed or pulled out of alignment, a track is typically used, either on a top of the sliding door or on the bottom of the sliding door, or both, to hold the door in place. A mullion is typically provided, typically in a center of the door opening, to engage the leading edges of the sliding door to hold the door in place when closed.

Moreover, to hold large sliding doors against door jambs, for example, to keep the sliding doors from being pushed or pulled out of alignment due to wind, for example, a plurality of cinches may be used, typically on both sides of the door opening to hold the sliding doors in place when the doors are closed. The cinches typically include hooks, either on the door or on the wall or jamb adjacent the door, and eyelets that engage the hooks. However, it is difficult to manually implement the plurality of cinches each time the door is required to be open or closed. A user must walk to each cinch and manually manipulate each to "unlock" the door for use thereof. In many cases, more than two or three cinches may be disposed on each side (especially for a relatively large door), requiring a user to walk from one side to the other so that the sliding door may be opened. Of course, once a user is done opening and closing the sliding doors, a user must then manually manipulate each cinch to "lock" the sliding doors against the jambs, thereby holding the door panel or panels in place.

However, to manually open and/or close large sliding doors, a user must attend to unlocking, uncinching and ultimately opening the doors. In many cases, this involves getting out of a vehicle, machine or equipment, walking to the door, unlocking the door, uncinching the door from the jambs, sliding open each door panel, climbing back inside the vehicle, machine or equipment, mobilizing the equipment through the doorway, parking the vehicle, machine or equipment, climbing down from the vehicle, machine or equipment, walking back to the doorway, and sliding closed each door panel. If a user attempts to manually open the door on a particularly windy day, the doors may be damaged due to the wind or other weather and/or a user may have difficulty holding the door in place as it opens and/or closes.

It is further known to automate the opening and closing of horizontally-sliding doors. Typically, a track is disposed on an outside of the structure, typically above the door opening and extending along the outside walls of the structure. The one or more door panels are typically interconnected with the track via at least one carriage attached to a looping chain. The chain is then moved linearly along the track via a motor that pulls the carriage and, ultimately, the one or more door panels either outward or inward, depending on the direction of the motor.

The motor typically sits on an outside of the structure and engages the doors externally to the structure. While this allows the equipment, including the tracks, the carriage, the chain and other like equipment, to stay clear of the door opening, the use of the motor and other equipment outside the structure has significant disadvantages.

Specifically, it may be difficult to keep the motor, track, chain, carriages, and other like equipment free of debris, and clear of weather. For example, dirt, leaves, water and other environmental factors may deleteriously impact the proper functioning of the equipment. Moreover, oftentimes automatic sliding doors are utilized in northern climes, especially when it may be difficult to exit vehicles to manually open a door due to extreme cold. However, the extreme cold may also have a deleterious effect on the proper functioning of the equipment.

A need, therefore, exists to provide systems, apparatus and methods for automating the opening of horizontally-sliding doors. Specifically, there is a need to provide systems, apparatus and methods for protecting equipment and for keeping the equipment free of weather, dirt or debris.

Further, a need exists for systems, apparatus and methods for automating sliding doors that helps to prevent doors from being pushed and/or pulled out of alignment, due to wind or other factors.

In addition, a need exists for systems, apparatus and methods for automating sliding doors that maintains clearance space. Specifically, a need exists for systems, apparatus and methods for automating sliding doors that maintains vertical space in a doorway, or minimizes impingements to vertical space in the doorway, thereby allowing relatively tall equipment to be transportable through the doorway opening. Moreover, a need exists for systems, apparatus and methods for automating sliding doors that maintains horizontal space in a doorway or minimizes impingements to horizontal space within the doorway.

Further, a need exists for systems, apparatus and methods for automating sliding doors that provides sealing of the door against one or more door jambs when the door is closed over the doorway. Still further, a need exists for systems, apparatus and methods for automating sliding doors allowing instant opening and/or closing of the same using one or more wired or wireless control systems.

SUMMARY OF THE INVENTION

The present invention relates to sliding door systems, apparatus and methods of using and making the same. Specifically, the present invention relates to systems for opening horizontally sliding doors on a structure, such as, for example, a barn, warehouse, hangar, or other building or structure. Moreover, the present invention relates to apparatuses for providing the automatic opening of sliding doors. In addition, methods of making and using the same are provided.

To this end, in an embodiment of the present invention, an automatic door moving system is provided, the automatic door moving system comprises: a building having a horizontally-moving door panel disposed over an entry opening, the entry opening bounded by a first side and a second side, a header on the top thereof, and a bottom, wherein the horizontally-moving door panel opens and closes over the entry opening; a track disposed horizontally; and a motor having an engagement mechanism, wherein the engagement mechanism is engaged to the track, wherein the motor drives the door panel horizontally over the entry opening.

In an embodiment, the track is disposed on the on the door panel, and further wherein the engagement mechanism engages the track on the door panel to move the door panel horizontally.

In an embodiment, the engagement mechanism is a sprocket attached to an axle, wherein the motor turns the axle and the sprocket for moving the door panel.

In an embodiment, the automatic door moving system further comprises: a door jamb at a first side of the entry opening, wherein the motor is mounted to the door jamb, and at least the axle and the sprocket extend through the entry opening to engage the track on the door panel.

In an embodiment, the door panel comprises a portion extending beyond the first side of the entry opening when the door panel is fully closed and further comprises: a wall of the building, wherein the wall extends from a first side of the entry opening; and an aperture within the wall, wherein the engagement mechanism of the motor extends through the aperture to engage the track on the portion of the door panel extending beyond the first side of the entry opening when the door panel is fully closed.

In an embodiment, the track comprises a chain forming a loop that extends from a first side of the entry opening to the second side of the entry opening, and further comprises: a carriage attached to the door panel, wherein the carriage engages the chain, and wherein the engagement mechanism engages the chain and drives the chain in a loop thereby driving the door horizontally across the entry opening.

In an embodiment, the chain is mounted above the entry opening and the carriage is disposed on a top of the door panel for engaging the chain.

In an embodiment, the automatic door opening system further comprises: a flat elongate portion disposed from a first side of the entry opening to the second side of the entry opening, and further wherein the carriage comprises a roller, the carriage supported by and rolling on the flat elongate portion via the roller.

In an embodiment, the motor is fixedly mounted to the door panel, and further wherein the door panel and the motor move together horizontally over the entry opening.

In an embodiment, the track is mounted from a first side of the entry opening to the second side of the entry opening, and wherein the motor moves along the track.

In an embodiment, the automatic door opening system further comprises: an elongated linkage linking the motor to the door panel.

In an alternate embodiment of the present invention, a horizontal door moving system for a building is provided, the horizontal door moving system comprises: a building having a horizontally-moving door panel disposed over an entry opening, the entry opening bounded by a first side and a second side, a header on the top thereof, and a bottom, wherein the horizontally-moving door panel opens and closes over the entry opening; a vertically extending flange on an inside surface of the door panel, wherein the vertically extending flange extends from a first point on the inside surface of the door panel to a second point on the inside surface of the door panel near an end of door panel; and a pin extending from a first side of the entry opening and engaging the vertically extending flange such that the pin, via engagement with the vertically extending flange, pulls the door panel closer to the first side of the entry opening as the door panel closes over the entry opening.

In an embodiment, the second point is closer to the inside surface of the door panel than the first point.

In an embodiment, the first point is at a first end of the door panel, and the second point is at a second end of the door panel.

In an embodiment, the vertically extending flange is an L-shaped bracket, the horizontally-extending portion thereof being connected to the door panel.

In an embodiment, the vertically extending flange is a U-shaped bracket, the horizontally extending portion thereof being connected to the door panel.

In an alternate embodiment of the present invention, a horizontal door moving system for a building is provided, the horizontal door moving system comprises: a building having a horizontally-moving door panel disposed over an entry opening, the entry opening bounded by a first side and a second side, a header on the top thereof, and a bottom, wherein the horizontally-moving door panel opens and closes over the entry opening; an elongate portion extending from a first side of the entry opening to the second side of the entry opening at the bottom of the entry opening; and an engagement mechanism extending from the bottom of the door panel and engaging the elongate portion for holding the door panel in alignment as it opens and closes over the entry opening.

In an embodiment, the elongate portion comprises an upwardly extending track and the engagement mechanism engages and traverses the upwardly extending track to keep the door panel in alignment as it opens and closes over the entry opening.

In an embodiment, the elongate portion comprises at least one cable and the engagement mechanism comprises at least one pin for engagement the at least one cable to keep the door panel in alignment as it opens and closes over the entry opening.

In an embodiment, the elongate portion comprises at least two cables and the engagement mechanism comprises an extended flange, the extended flange disposed between the at least two cables to keep the door panel in alignment as it opens and closes over the entry opening.

It is, therefore, an advantage of the present invention to provide systems, apparatus and methods for automating the opening of horizontal-sliding doors.

Specifically, it is an advantage of the present invention to provide systems, apparatus and methods for protecting equipment and for keeping the equipment free from weather, dirt or debris.

Further, it is an advantage of the present invention to provide systems, apparatus and methods for automating sliding doors that helps to prevent doors from being pushed and/or pulled out of alignment, due to wind and/or other factors.

In addition, it is an advantage of the present invention to provide systems, apparatus and methods for automating sliding doors that maintains clearance space.

Specifically, it is an advantage of the present invention to provide systems, apparatus and methods for automating sliding doors that maintains vertical space in a doorway, or minimizes impingements to vertical space in the doorway, thereby allowing relatively tall equipment to be transportable through the doorway opening.

Moreover, it is an advantage of the present invention to provide systems, apparatus and methods for automating sliding doors that maintains horizontal space in a doorway or minimizes impingements to horizontal space within the doorway.

Further, it is an advantage of the present invention to provide systems, apparatus and methods for automating sliding doors that provides sealing of the door panel or panels against one or more door jambs when the door panels are closed over the doorway.

Still further, it is an advantage of the present invention to provide systems, apparatus and methods for automating sliding doors allowing instant opening and/or closing of the same using one or more wired or wireless control systems.

Additional features and advantages of the present invention are described in, and will be apparent from, the detailed description of the presently preferred embodiments and from the drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 31 illustrates a side elevated view of a bracket interconnected with a horizontally-sliding door in an embodiment of the present invention.

FIG. 32 illustrates a perspective view of the bracket and door in an embodiment of the present invention.

FIG. 35 illustrates a perspective view of a bracket in an embodiment of the present invention.

FIGS. 36A-36C illustrate views of an alternate bracket in an embodiment of the present invention.

FIG. 37 illustrates a perspective view of a plurality of floor guides and a horizontally-sliding door on a structure in an embodiment of the present invention.

FIG. 38 illustrates a top view of a floor guide in an embodiment of the present invention.

DETAILED DESCRIPTION OF THE PRESENTLY PREFERRED EMBODIMENTS

The present invention relates to sliding door systems, apparatus and methods of using and making the same. Specifically, the present invention relates to systems for opening horizontally sliding doors on a structure, such as, for example, a barn, warehouse, hangar, or other building or structure. Moreover, the present invention relates to apparatuses for providing the automatic opening of sliding doors. In addition, methods of making and using the same are provided.

Figure 1:
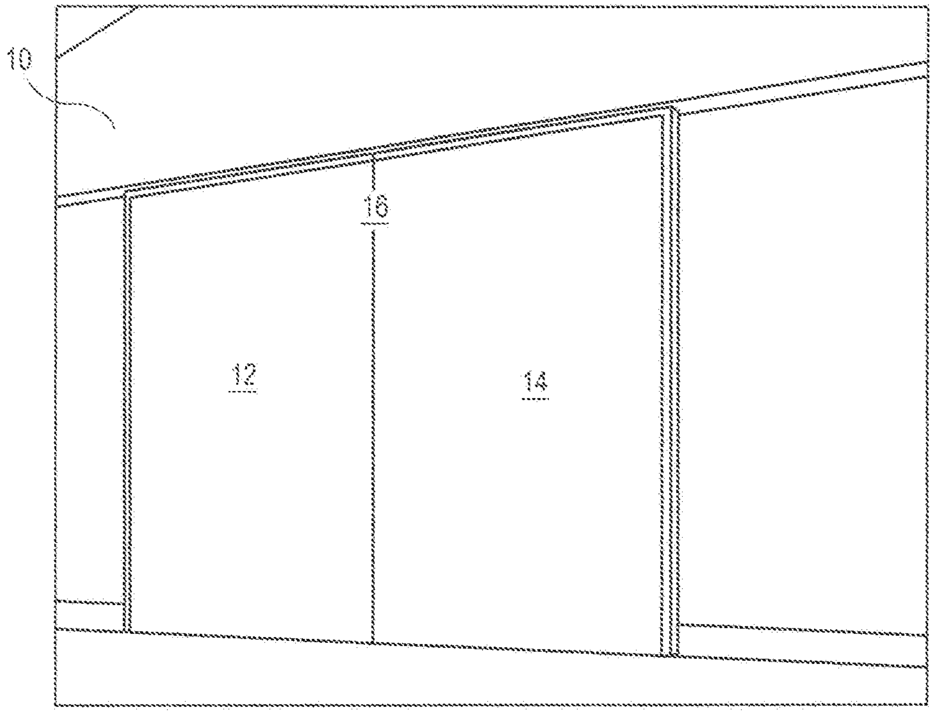
FIG. 1 illustrates a perspective view of a building having a bifurcated sliding door in a closed configuration in an embodiment of the present invention.
Figure 2:
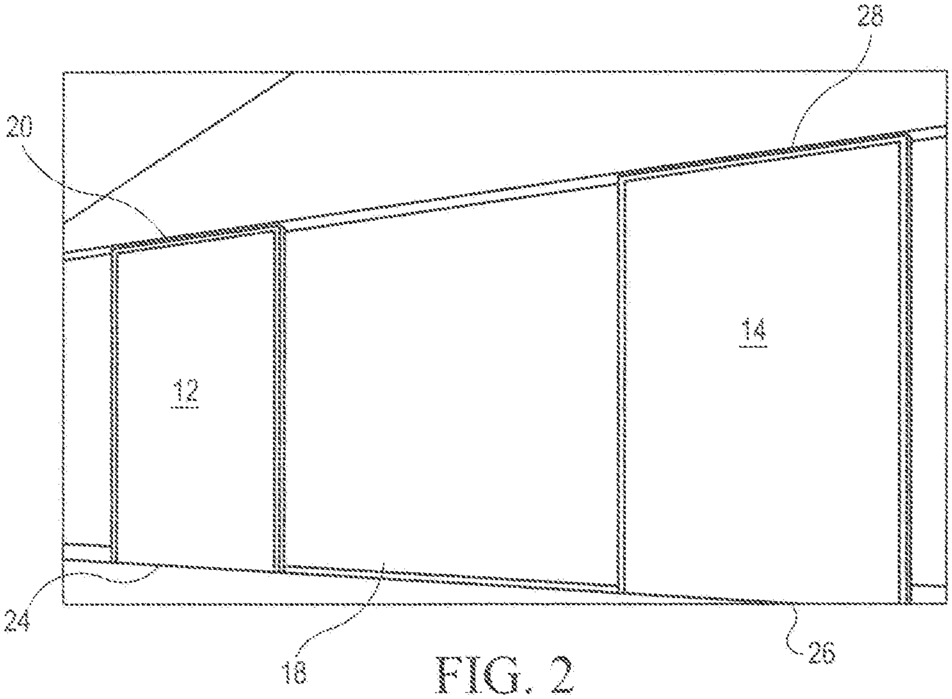
FIG. 2 illustrates a perspective view of the building with a bifurcated sliding door in an open configuration in an embodiment of the present invention.

To this end, FIG. 1 illustrates a perspective view of a building 10 having laterally sliding door panels 12, 14 of a bifurcated door 16 in an embodiment of the present invention. The bifurcated door 16 may cover an entrance 18 to the building 10, as illustrated in FIG. 2. The building 10 may be a warehouse, barn, hangar, storage area, or any other building. The bifurcated door 16 generally opens laterally, or horizontally, with each of the two panels 12, 14 opening outwardly from a middle of the entrance 18. Alternatively, the bifurcated door 16 may open from any other location over the entrance 18 of the building, although in a preferred embodiment, the bifurcated door 16 opens from a middle location thereof. Alternatively, the door may have a single panel covering the entirety of the entrance, and the door may laterally move from one end of the entrance to the other to gain access to the building 10.

Generally, the two panels 12, 14 of the bifurcated door 16 may be set upon upper tracks 20, 22 and/or lower tracks 24, 26, as apparent to one of ordinary skill in the art. By traversing tracks 20, 22 and 24, 26, the door may move laterally and outwardly over the entrance 18 to expose the entrance 18 when opened, and laterally and inwardly over the entrance 18 to cover the entrance 18 when closed. Typically, the two panels 12, 14 of the bifurcated door 16 move laterally on an outside of the building 10. Generally, the two panels 12, 14 have rollers at or near the tops of the panels 12, 14 for engaging the tracks 20, 22 for smooth lateral movement thereof.

Figure 3:
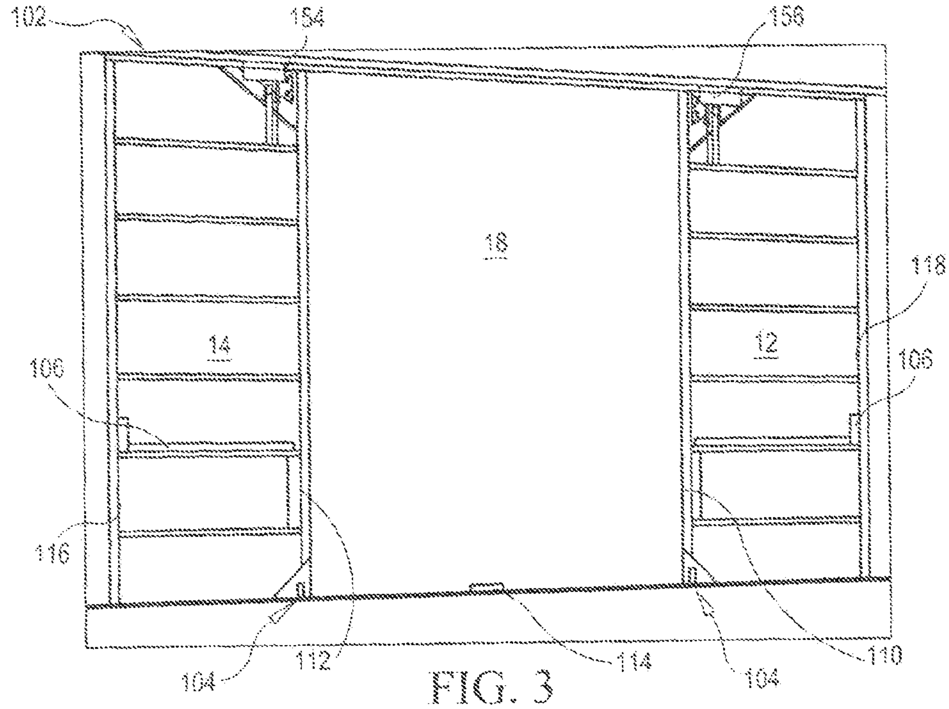
FIG. 3 illustrates a perspective interior view of the building having the bifurcated sliding door in an open configuration in an embodiment of the present invention.

Referring now to FIG. 3, a perspective view of a system 100 of the present invention is illustrated. The system 100 may include the two panels 12, 14 of the bifurcated door 16 disposed on the building 10, and disposed to move laterally and outwardly over the entrance 18 to expose the entrance 18. Therefore, a user may open the bifurcated door 16, gain access to the interior of the building 10, and utilize the same. For example, the building may preferably be a barn or a warehouse that houses equipment, such as a tractor or other farm equipment. The tractor or other equipment may be removed from the building 10 through the entrance 18 when the bifurcated door 16 is opened.

The system 100 may include a drive system 102, a leading edge system 104 and a trailing edge system 106. The drive system 102, the leading edge system 104 and the trailing edge system 106 may act in concert to provide opening and closing of the bifurcated door 16. Specifically, the drive system 102 provides the power to mobilize the two panels 12, 14 of the bifurcated door 16 outwardly and inwardly for opening and/or closing the door 16, respectively. Moreover, the drive system 102 also maintains an alignment of the upper portions of the two panels 12, 14 of the bifurcated door 16 as the two panels 12, 14 open and/or close.

Moreover, the leading edge system 104 aligns the leading edges 110, 112 of the two panels 12, 14, respectively, of the bifurcated door 16 as the two panels 12, 14 laterally traverse the opening 18. Moreover, the leading edge system 104 maintains the alignment of the two panels 12, 14 of the door, especially when forces act to push, pull or otherwise move the two panels 12, 14 out of alignment. For example, a wind from the outside of the building 10 and the inside of the building 10 may push against the two panels 12, 14 causing misalignment of the two panels 12, 14, especially when the two panels 12, 14 are laterally traversing the entrance 18 during opening and/or closing the door 16. When closed, the two panels 12, 14 may secure together resisting the push or pull of wind. In addition, a mullion 114 is typically provided to ensure the security of the two panels 12, 14 when closed. The leading edge system 102 may hold the two panels 12, 14 in alignment at the bottoms of the two panels 12, 14 so that the two panels 12, 14 maintain their relative positions, and stay on the external tracks 20, 22 and 24, 26 that may be disposed on an outside of the building 10, as illustrated in FIG. 2.

The trailing edge system 106 provides further security in maintaining the alignment of the two panels 12, 14 when laterally traversing the entrance 18 when opening and/or closing. The trailing edge system 106 provides alignment of the two panels 12, 14 at the edges 116, 118 of the entrance 18, such as at the jambs of the entrance 18. Moreover, the trailing edge system 106 may automatically cinch the two panels 12, 14 of the bifurcated door 16 against the building 10, such as at the door jambs at the edges 116, 118 of the entrance 18 when the bifurcated door 16 is closed.

Referring now to the drive system 102 of the present invention (as illustrated in FIGS. 3-6), the drive system 102 includes a motor 150 that drives a chain loop 152 attached to carriages 154, 156. The carriages 154, 156 are rigidly connected to the two panels 12, 14 of the bifurcated door 16. Moreover, the carriages 154, 156 engage and may traverse tracks 158, 160, respectively. When the motor 150 engages the chain loop 152, the two panels 12, 14 of the bifurcated door 16 open outwardly or close inwardly depending on the direction of the motor 150. As illustrated in FIG. 3, the motor 150, the chain loop 152, the carriages 154, 156, the tracks 158, 160, and all other ancillary equipment, such as safety equipment, brackets, connectors and the like, may be disposed on an inside of the building 10 instead of, typically, on the outside of the building 10. This may allow the drive system 102 to be fully protected from the elements, such as rain, wind, snow, sleet, hail, sun, and other weather elements, as opposed to prior art systems that are exposed to the elements and require further protection therefrom.

Figure 4:
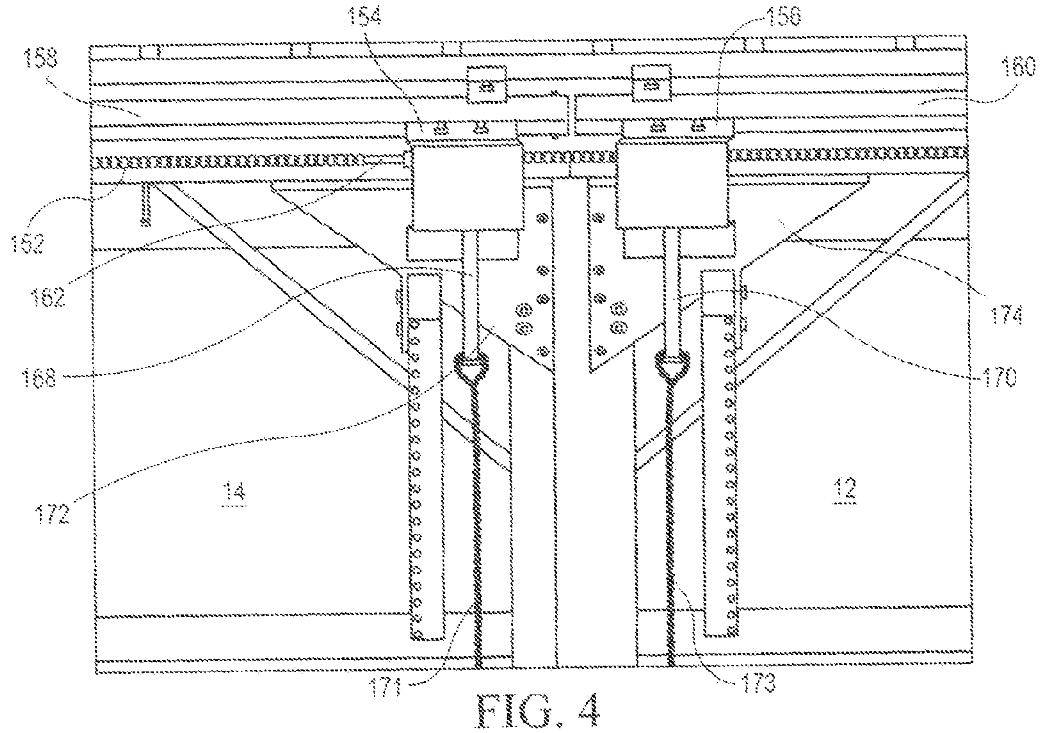
FIG. 4 illustrates a close up view of door panels of a bifurcated sliding door in an embodiment of the present invention.
Figure 5:
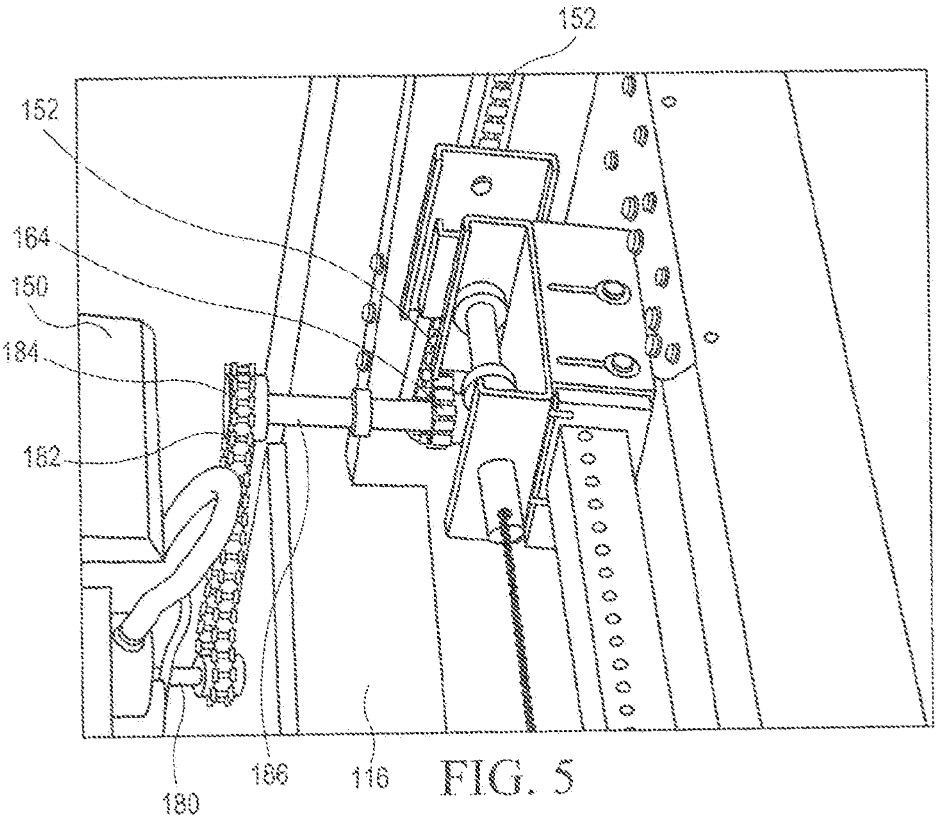
FIG. 5 illustrates a close up view of a drive system for the sliding door in an embodiment of the present invention.

Referring now to FIG. 4, a close-up view of the two panels 12, 14 of the bifurcated door 16, in a closed position, and the chain loop 152, carriages 154, 156 and the tracks 158, 160, is illustrated. Although the tracks 158, 160 are generally disclosed as separated, these elements may be disposed as a continuous element to form a single track for the carriages 154, 156 to traverse, as illustrated in FIG. 4. The carriage 154 may be connected to a first end of the chain loop 152 on a first end of the carriage 154 via an adjustable take up bolt 162, and a second end of the chain loop 152 on a second end of the carriage 154. The chain loop 152 may, therefore, form a continuous loop that traverses over a sprocket 164 (as illustrated in FIG. 5) at or near the edge 116 of the entrance 18, and an idler (not shown) at or near the edge 118 of the entrance 18. Therefore, the carriage 154 may be directly connected to the chain 152 loop in the lower portion of the continuous loop, while the carriage 156 may be directly connected to the chain loop 152 (via bolts, or other like connectors) on the upper portion of the continuous loop. Therefore, when the motor drives the chain 152, the doors will laterally traverse the opening 18 in opposite directions. It should be noted that the adjustable take up bolt 162 may preferably be as short as possible, allowing the chain 152 to move the carriage 154 as close as possible to the gear 164 at or near the edge 116 of the entrance 18, thereby maximizing the horizontal distance of the opening 18 when the two panels 12, 14 of the bifurcated door 16 are fully open.

As noted, the tracks 158, 160 holding the carriages 154, 156 may be attached directly to a ceiling of the internal area of the building 10, or may be suspended therefrom via brackets. Alternatively, the tracks 158, 160 may be suspended using L-brackets, angle mounting brackets or similar brackets and connected to a wall disposed above the entrance 18.

The carriages 154, 156 may further have release pins 168, 170 disposed therebeneath, having chains 171, 173 for releasing the carriages 154, 156 from the tracks 158, 160, as necessary for safety and/or for manually moving the two panels 12, 14 of the bifurcated door 16. The carriages 154, 156 and the release pins 168, 170 may be connected to the two panels 12, 14 of the bifurcated door 16, respectively, with triangular-shaped brackets 172, 174. It is preferable that the release pins 168, 170, as well as the carriages 154, 156, be placed as close as possible to the edges of the two panels 12, 14 of the bifurcated door 16 to ensure as full opening of the two panels 12, 14 of the bifurcated door 16 when in a fully open position. It is preferred that the brackets 172, 174, as well as the carriages 154, 156, release pins 168, 170, and any other equipment disposed in the vicinity thereof, be relatively small in shape, and mounted on the brackets 172, 174 as closely to the leading edges 110, 112 of the two panels 12, 14 of the bifurcated door 16 as possible so that the two panels 12, 14 may open as fully as possible, since the carriages 154, 156, release pins 168, 170 and other like equipment may interfere with the full opening of the bifurcated door 16, especially as the carriages 154, 156 and other like equipment approach the edges 116, 118 of the entrance 18.

Figure 6:
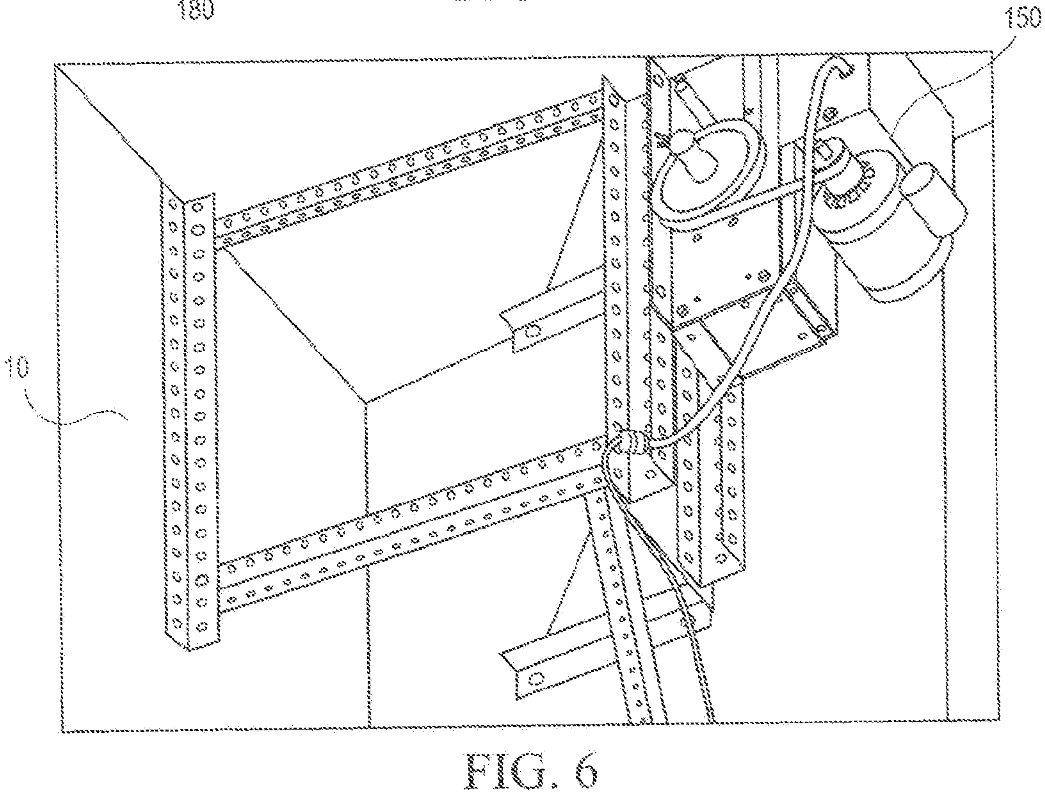
FIG. 6 illustrates a close up view of a motor and bracket system for the sliding door in an embodiment of the present invention.

Referring now to FIG. 5, a close up perspective view of the motor 150, and its connection to the chain 152. Specifically, the motor 150 may be disposed on an interior of the building 10 such that the motor is removed from the elements, thereby protecting the same. The motor 150 may be attached to an interior wall of the building 10 (as shown in FIG. 6), and may be disposed such that a shaft 180 may drive a chain 182 engaging a sprocket 184 and shaft 186, thereby engaging the sprocket 164 to drive the chain 152 for opening and/or closing the two panels 12, 14 of the bifurcated door 16. Preferably, the motor 150 is disposed away from the entrance 18 such that the motor 150 does not create an obstruction for the entrance 18, thereby allowing the passage of equipment through the entrance 18. Moreover, the motor 150 preferably has sufficient power to engage the two panels 12, 14 of the bifurcated door 16 and move the same when necessary. Although a preferred motor is illustrated, any motor may be used to drive the chain 152 thereby opening and/or closing the door panels 12, 14, as apparent to one having ordinary skill in the art, and the invention should not be limited as described herein.

As illustrated in FIG. 6, a plurality of brackets may be utilized to hold the motor in a position for engaging the chain 152 and further minimizing or eliminating any obstruction of the motor 150 over the entrance 18, thereby allowing, to the maximum extent, any equipment to be moved through the entrance 18.

Figure 7:
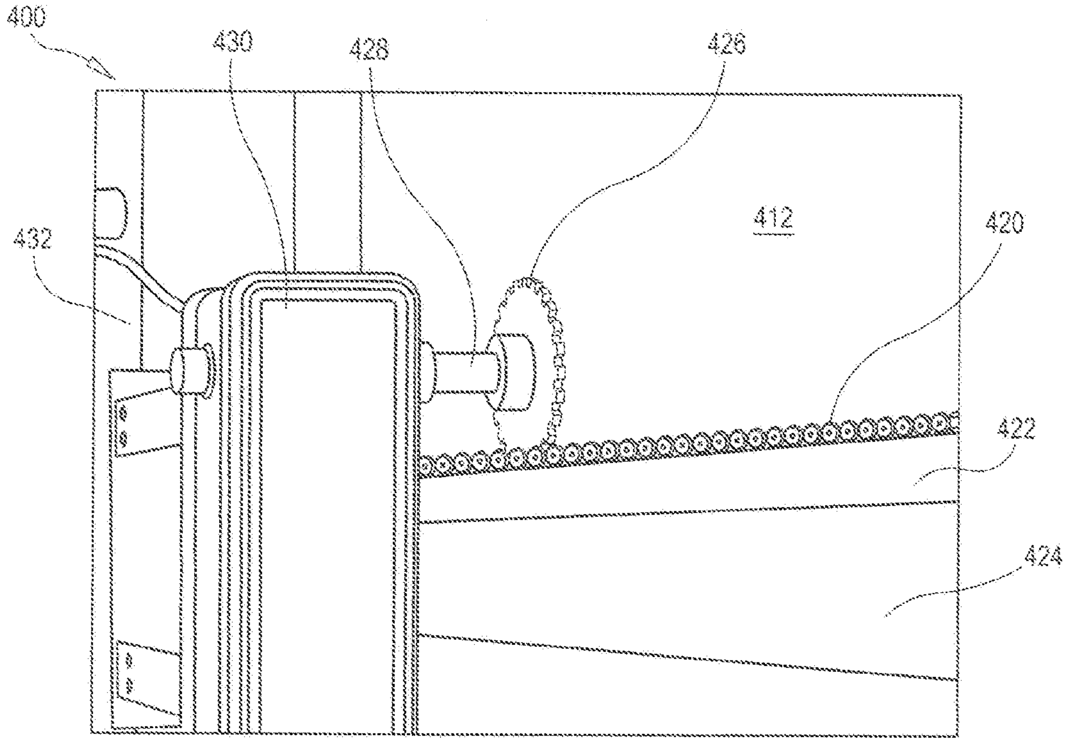
FIG. 7 illustrates a perspective view of an alternate drive mechanism for moving a door panel open and closed in an embodiment of the present invention.

Referring now to FIG. 7, an alternate embodiment of a sliding door system 400 is illustrated. The sliding door system 400 may include a door panel 412 having a track 420 disposed on the inside surface of the door panel 412. Specifically, the track 420, as shown in FIG. 7, sits on an elongated piece of angle iron 422 that is rigidly disposed on the top of a reinforcing plank 424 disposed laterally across the door panel 412. The track 420 may engage a pinion gear 426, extending from a motor 430 via shaft 428. The motor 430 may be rigidly disposed on or near the inside door jamb 432 or nearby wall adjacent the door panel 412.

Thus, the motor 430, via movement of the pinion gear 426 engages the track 420, which laterally moves the door panel 412 open or closed over a door opening in a building, allowing ingress or egress thereof. By eliminating the overhead chain and carriage, as described above with respect to previous embodiments, better clearance is provided, as space is not required for the overhead chain and carriages, thereby providing a larger vertical opening space on a horizontally sliding door. This may be useful for moving large equipment into and out of a building. In addition, the door sliding system 400 may provide a more consistent system for very large door openings, as the previous embodiments utilizing overhead chains and carriages may be limited to only a certain size door opening for proper utility.

The motor 430 may also include a release that allows the pinion gear to move freely so that the door panel 412 may be moved manually, if necessary, or for safety purposes. Moreover, the pinion gear may include a safety cover, such as a box, that may be attached to the motor 430 and may include a small opening in the vicinity of the track 420 to allow the track 420 to move freely through the safety cover when the door panel 412 is moved by the pinion gear 426. The safety cover may completely cover or at least partially cover, the pinion gear to prevent body parts, such as fingers, hair or other body parts, from entering or engaging the pinion gear and track interface.

Figure 8:
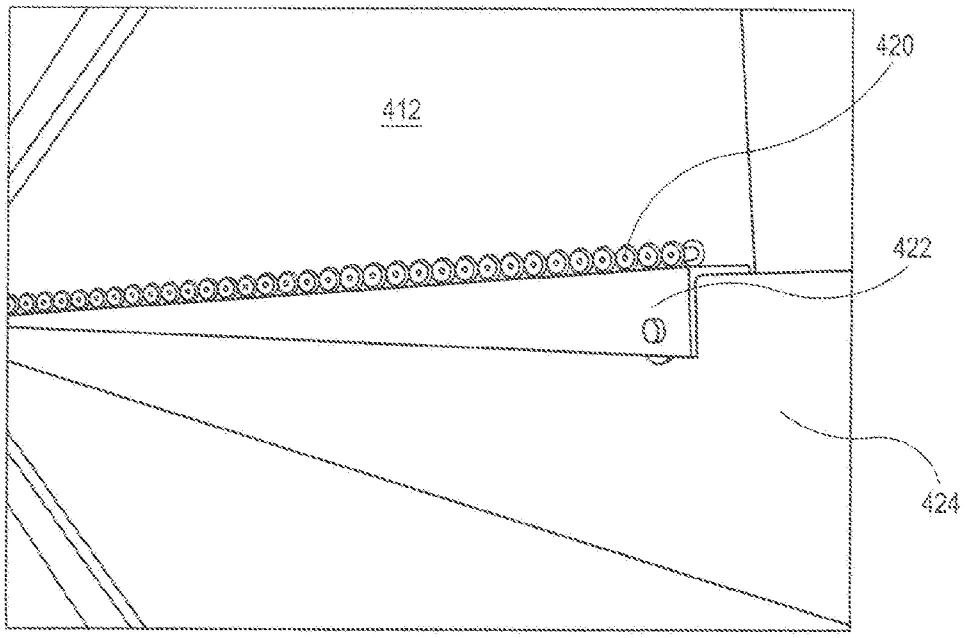
FIG. 8 illustrates a perspective view of an elongated track on an inside surface of a door panel in an embodiment of the present invention.

FIG. 8 illustrates a close-up view of the track 420 disposed on the angle iron 422, rigidly disposed on the reinforcing plank 424 on the inside surface of the door panel 412. The angle iron may be bolted to the reinforcing plank or attached via any other means, thereby providing a rigid surface for disposing the track 420 thereon. The track 420 may be an elongated chain, as shown in the figures, that may be welded to the angle iron 422 for rigid disposition thereof to the angle iron. Preferably, the track 420 is spot-welded to the angle iron 422. The chain may be useful for use as the track 420 and engagement with the pinion gear 426 because the chain may be transported as smaller pieces that may be constructed and utilized on the door panel 412, no matter the size of the door panel. Thus, the chain may preferably be shipped in relatively small lengths, such as 6' in length and may be easily installed to the door panel 412. Moreover, the track 420 may be relatively easy to install because it is generally disposed relatively low on the door panel, such as, preferably, about 6' to about 12' from the floor, and specialized equipment, such as a lift, may not be necessary for installation thereof. It should be noted, however, that the track 420 may be disposed at any location on the door 412 as apparent to one of ordinary skill in the art, and should not be limited as described herein.

In a preferred embodiment, the user of the system 400, as demonstrated herein, may utilize a large section of track 420 that is sized to fit the inside horizontal length of a door panel, as described herein. The track 420 may consist of a plurality of angle brackets that are separated from each other by one or more links of the chain, with the chain welded over the entirety of the track 420. The angle brackets may be any size useful for the present invention and disposed in end-to-end configuration with the chain welded thereover to form the continuous track 420. Thus, because of the spacing between angle iron, the track may be folded up for easy transport thereof. Moreover, when disposed on the door panel, as described herein, the track 420 may be shimmed up and/or down to maintain as level a track 420 as possible to maintain the interface between the track 420 and the pinion gear 426. Moreover, the track 420 may be disposed in and/or out relative to the surface of the door panel to maintain a straight path for the pinion gear to traverse thereover.

Figure 9:
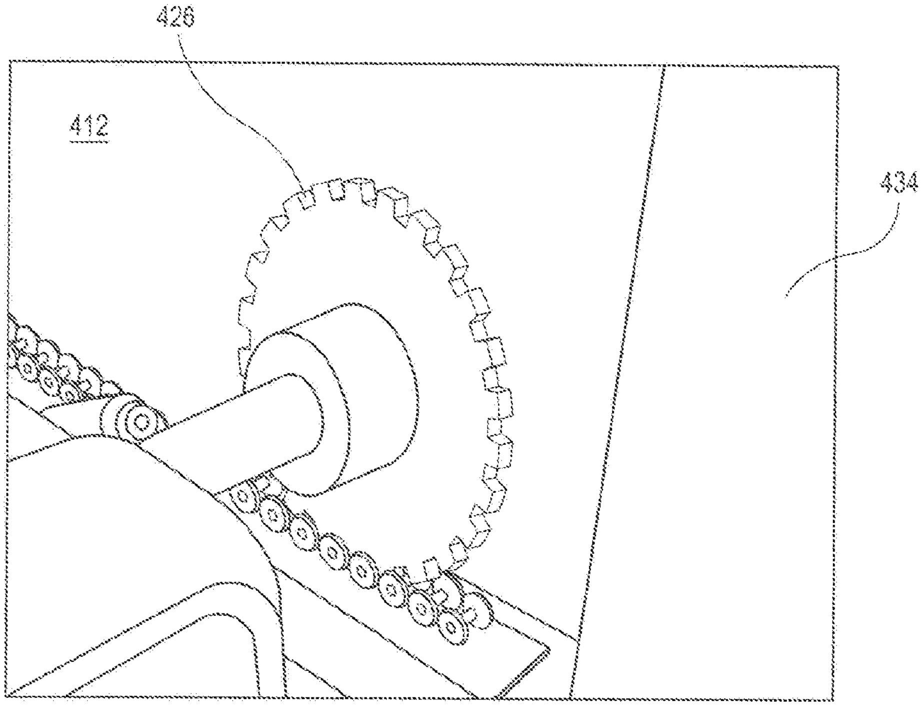
FIG. 9 illustrates a close-up view of a pinion engaging a track on an inside surface of a door panel in an embodiment of the present invention.

FIG. 9 illustrates a close-up view of the pinion gear 426 engaging the track 420 at a terminal end of the track 420. Because there is no need for carriages, or carriage brackets, as compared to previous embodiments, the pinion gear 426 can be disposed and interact with the track 420 very close to an end of the door panel, allowing the door panel to be opened to a relatively greater extent, providing relatively more horizontal clearance for the door opening. This may be useful for relatively large equipment that may require movement in and out of the building. As shown in FIG. 9, the pinion gear 426 may be moved so as to be disposed very close to a vertical reinforcement plank 434 that may be disposed on an end of the door panel 412.

Alternatively, a motor (not shown) may be mounted on an opposite side of a door jamb, outside the door opening, and the motor, having an axle and sprocket, may extend through a wall of the building and engage a track disposed on an extended door panel. Specifically, the extended door panel may be larger than the door opening (or half of the door opening with a bifurcated door) and an extended portion thereof may extend past the door jamb providing a sufficient portion for the track on the extended door panel to engage the sprocket of the motor. Therefore, the motor may still reside within the confines of the building, with the axle thereof extending through the wall of the building to engage the door panel disposed on an outside track of the building. In this configuration, neither the motor nor any component thereof, such as brackets, axles, sprockets, or the like, impinges on the horizontal opening space of the door opening. Therefore, the door panel or panels may be opened as fully as possible, which may be beneficial for moving equipment in or out of the building.

The sliding door system 400, illustrated in FIGS. 7-9 may be combined with other systems of the present invention, as described below, such as the trailing edge control system 106 to ensure that the door panel is disposed tightly against the door jambs when closed, or the leading edge control system 104 to ensure that the door panel maintains its lateral trajectory as it traverses the door opening.

The sliding door system 400 may be relatively useful because a relatively small motor may be used to laterally open a door panel. Moreover, while the sliding door system 400 of the present invention described in FIGS. 7-9 shows a single door panel (412) opened by a single motor (430), a double door system may also be opened, wherein two door panels horizontally traverse the door opening to expose the door opening, such as described above in previous embodiments. In such a system, two motors, disposed on opposite ends of the door opening, may engage tracks disposed on the inside surface of the door panels, respectively. Each motor may be tasked with opening up one of the door panels, and the motors may be synchronized and controlled by a master control to ensure that the motors work together to open the door panels at the same time. Alternatively, controls may be utilized to open only one of the door panels and not the other, or to open one door panel and close the other. In a preferred embodiment, each door panel will move laterally in opposite directions to open and expose the door opening or to close and cover the door opening.

Figure 10:
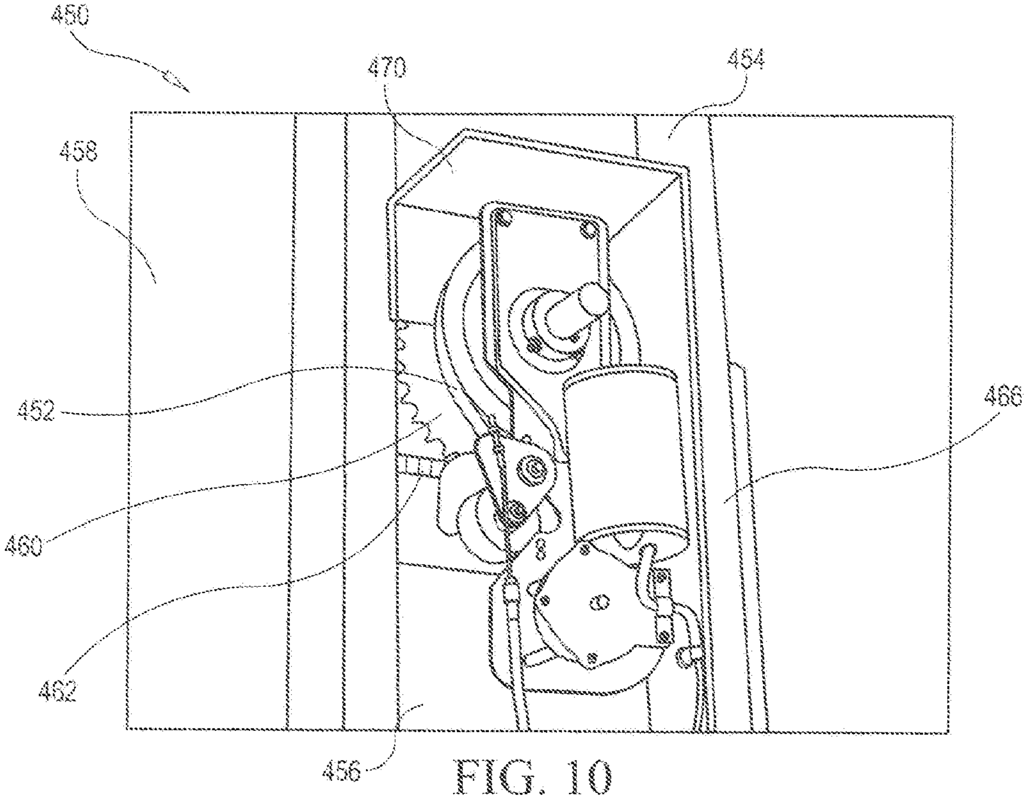
FIG. 10 illustrates a mounted motor having a pinion engaged with a track on an inside surface of a door panel in an embodiment of the present invention.

FIG. 10 illustrates a system 450 in an alternate embodiment of the present invention. The system 450 includes a motor 452 bracketed to a door jamb 454 or otherwise to a wall disposed adjacent a sliding door 456 that may slide across an opening 458. As disclosed above with reference to FIGS. 7-9, a pinion 460 on the motor 452 may engage a track 462 disposed on an inside surface of the sliding door 456. In a preferred embodiment, the motor 452 may be a Zap Controls Zap Series 3 DC motor, having a drive shaft and pinion, or sprocket to engage the track disposed on the inside surface of the sliding door 456. This motor is preferred because it is of relatively small size yet relatively powerful enough to engage and move the sliding door 456, and offers safety benefits. For example, the Zap motor described herein may detect an obstruction without the use of a pneumatic seal component. Moreover, the motor may be remote controlled, including requisite hardware such as photocells, remote controls, antennas, an electronic control box, or any other like component for engaging and driving the motor as needed and desired. Although preferable motors, such as, especially, the Zap motor and, for example, a Liftmaster motor, are described herein, it should be noted that any motor, such as any jackshaft motor, may be utilized to perform the function of moving the door panels, as described herein.

The motor 452 may generally sit within and may be rigidly held in an L-shaped bracket 470, described in further detail below with respect to FIGS. 12 and 13. The L-shaped bracket 470 may be held in place on the door jamb or wall 454 on jamb bracket 466, described below in more detail with reference to FIG. 11.

Figure 11:
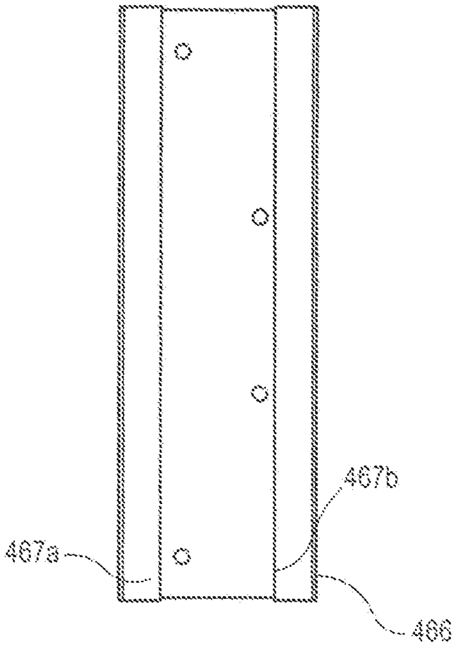
FIG. 11 illustrates a front view of a mounting bracket in an embodiment of the present invention.
Figure 12:
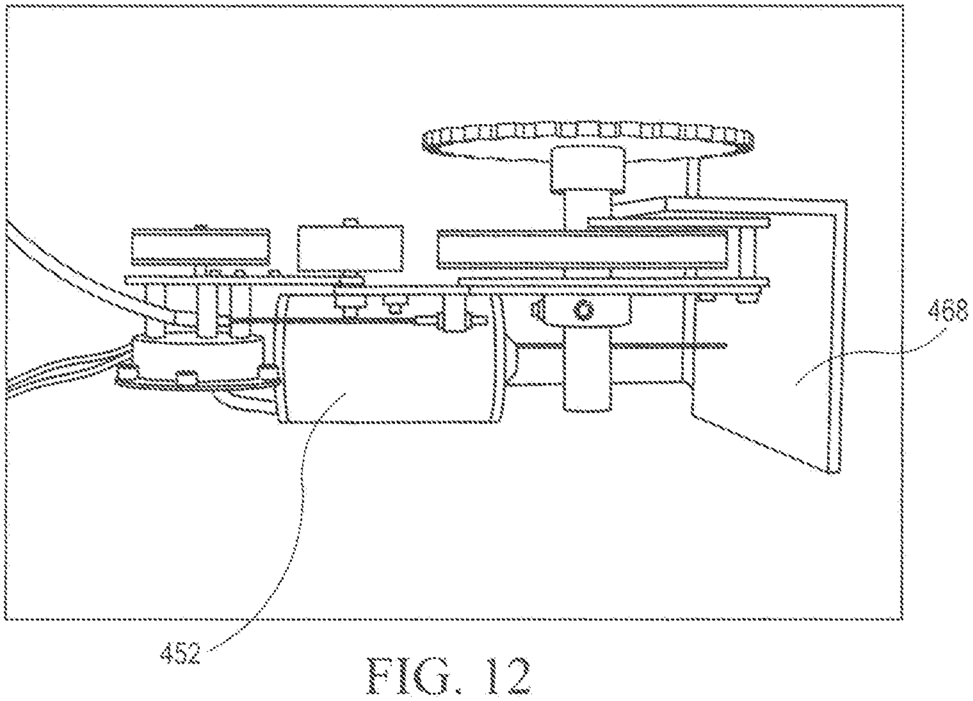
FIG. 12 illustrates a top view of a motor assembly and mounting bracket in an embodiment of the present invention.

FIG. 11 illustrates jamb bracket 466 that may be rigidly held in place on door jamb 454 or other wall, as described in FIG. 10. Jamb bracket 466 may be bolted to the door jamb 454, or otherwise held in place so that the motor, when engaged in jamb bracket 466, may not move and stay engaged with the track 462 to open and/or close the sliding door 456. The jamb bracket 466 may have side tracks 467*a*, 467*b* whereby the L-shaped bracket 470, as described in more detail below, may sit.

Figure 13:
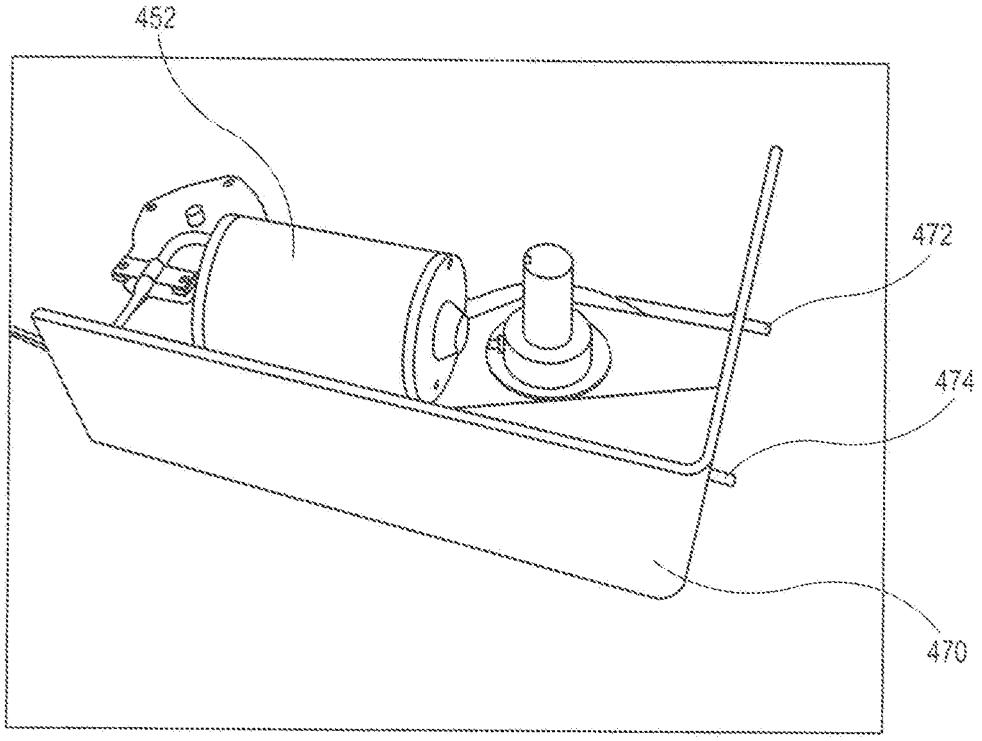
FIG. 13 illustrates a perspective view of a motor assembly and mounting bracket in an embodiment of the present invention.

The motor 452 may be attached to sub-bracket 468 that may rigidly hold the motor 452 in place, when connected to L-shaped bracket 470, as illustrated in FIG. 13. L-shaped bracket 470 may rigidly hold the motor (held in place 6 by sub-bracket 468). Sub-bracket 468 may be bolted to L-bracket 470 via long bolts 472, 474.

The L-shaped bracket, rigidly holding the sub-bracket 468 and, ultimately, the motor 452 may slide into jamb bracket 466, when jamb bracket 466 is bolted to the door jamb 454. When the L-shaped bracket 470 is slid into jamb bracket 466, the pinion or sprocket may engage the track, transferring the rotational movement of the pinion or sprocket to the linear movement of the sliding door 456. The L-shaped bracket 470 may sit freely in the jamb bracket 466, and gravity may hold the motor 452 in place. Alternatively, L-shaped bracket 470 may be secured to the jamb bracket 466 with a downwardly biased spring, allowing some vertical movement of the motor 452 (such as if the pinion or sprocket encounters uneven portions of the track 462, but keeping downward pressure so that the pinion or sprocket does not lift off of the track 462.

Figure 14:
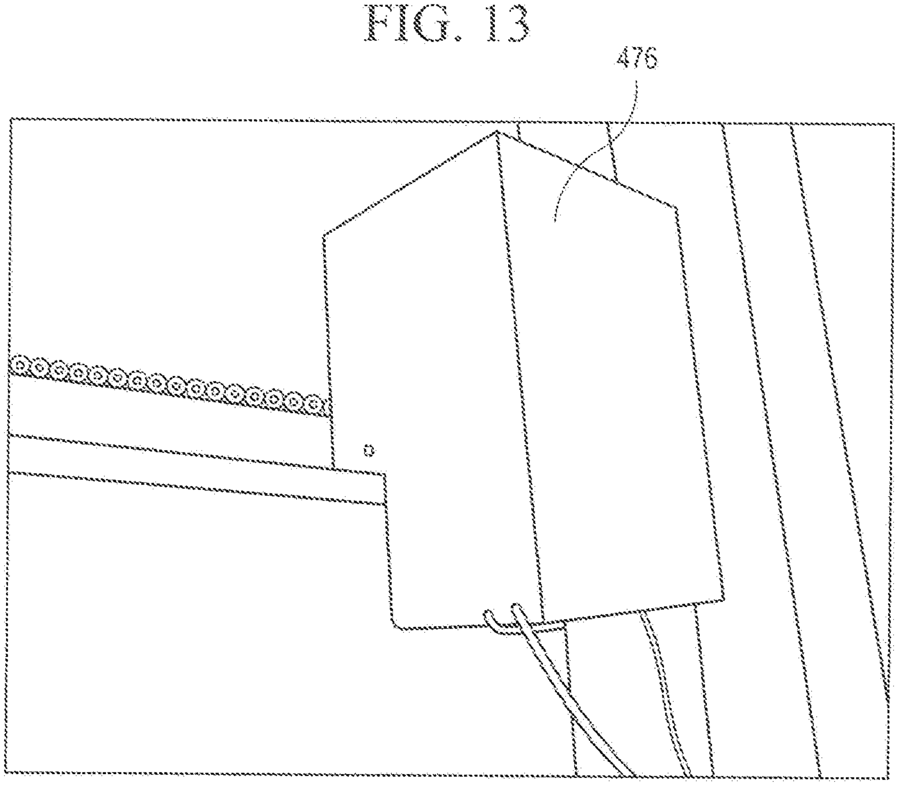
FIG. 14 illustrates a mounted motor having a protective cover in an embodiment of the present invention.

FIG. 14 illustrates a cover 476 that may be fit over the motor 452 and bracket system as described herein, to keep the motor 452, pinion or sprocket, and/or other components clear of debris that may interfere with the proper working of the system, and further to ensure safety so that users may be less inclined to get injured by the moving parts thereof. The cover 476 may be slid over the L-bracket 470 and jamb bracket 466 and may be rigidly disposed thereon, such as by bolting the cover to the L-shaped bracket 470 and/or the jamb bracket 466, or any other like component to hold the cover 476 in place.

Figure 15:
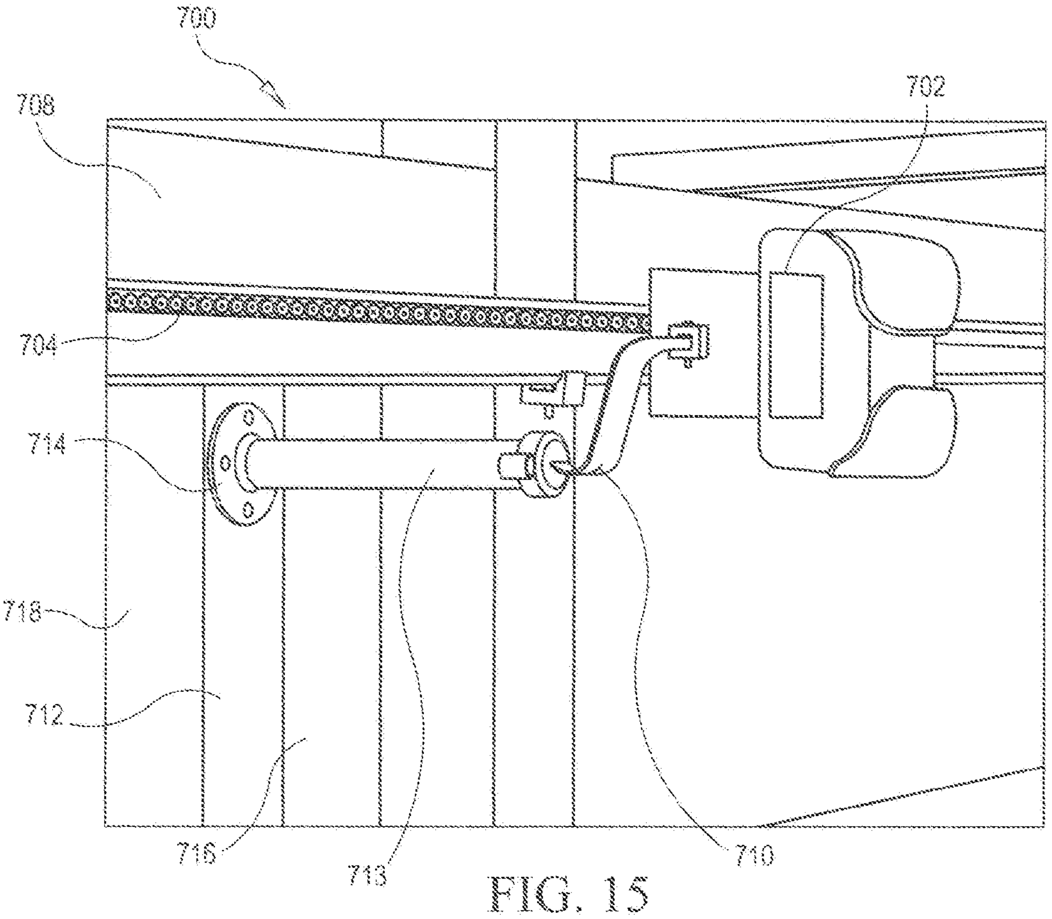
FIG. 15 illustrates a movable motor and linkage assembly for moving a horizontally slidable door panel in an embodiment of the present invention.
Figure 16:
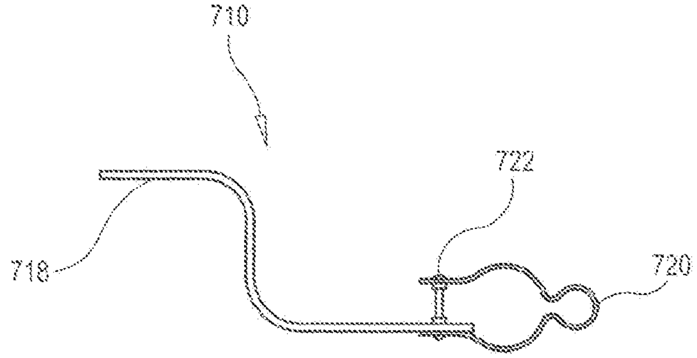
FIG. 16 illustrates a side view of a linkage assembly in an embodiment of the present invention.

In an alternate embodiment of the present invention, a system 700 is illustrated in FIGS. 15-16. Specifically, the system 700 includes a door panel 712 (whether bifurcated or single) interconnected to a motor 702 that may be disposed on and engage a chain or track 704, the chain or track 704 disposed above the door 712 and an entrance 718 formed when the door 712 is opened on a header 708 spanning the entrance 718. The motor 702 may be interconnected to the door 712 via a bracket 710 and an extended bar 713 that is rigidly connected to the door 712 via bracket 714. Thus, the motor 702, when engaged, moves along the chain or track 704, and the interconnection of the motor 702 with the door 712 via the bracket 710 and the extended bar 713 causes the door 712 to open and close with the movement of the motor 702. The extended bar 713 may be mounted to the door 712 via bolts, welds or any other connection means at or very near the leading edge of the door 712, allowing the door 712 to be opened so that the leading edge is very close to the door jamb 716, thereby maximizing the size of the entrance 718 formed when the door 712 is opened, but not interfering with a second door (in the case of a bifurcated door). The connection between the extended bar 713 and the door 712 may be reinforced, such as via a support plate, such as a triangular plate, to reinforce the same.

In a single door configuration, a single motor (702) may engage the single door (712), causing it to move when the motor moves along the track, opening and closing the door over the entirety of the entrance 718. In a bifurcated door configuration, each door panel (not shown) may have a motor connected thereto, running along a respective chain or track (including, for example, on the same track), thereby opening and closing the bifurcated door. A control (not shown) may be utilized for ensuring that two motors, in a bifurcated door configuration, open and close in synchronization.

FIG. 16 illustrates a close-up view of the bracket 710, in an embodiment of the present invention. The bracket 710 includes an S-shaped piece 718 so that the motor 702, disposed on the chain or track 704 on the header 708 can link with the extended bar 713 and, thus, the door 712. Disposed on an end of the S-shaped piece 718 may be a connector 720 to engage the extended bar 713. The connector 720 may engage an end of the extended bar 713 and may be tightened on the extended bar 713 via bolt 722, thereby linking the motor 702 with the door 712 for movement of the door 712 when the motor 702 moves along the track 704.

The extended bar 713 may be any size necessary to adequately link the bracket 710 connected to and extending from the motor 702, especially considering that doors on barns, warehouses, and other like buildings are typically externally mounted, having a distance from the door to the track 704 mounted to the header 708. In addition, the S-shaped piece 718 may be any length and may be in any bent configuration necessary to span the height distance between the extended bar 712 and the motor 702 disposed thereabove. Preferably, the extended bar 712 and the bracket 710 are made of a rigid and strong material, such as metal, so as to rigidly hold and move the door 12 when the motor 702 moves along the track 704.

The motor 702 in the system 700, as described herein, that traverses the chain or track 704 may preferably be a motor manufactured by Summer Synoris although, of course, any other motor able to traverse the track 704 may be utilized as apparent to one of ordinary skill in the art.

Figure 17:
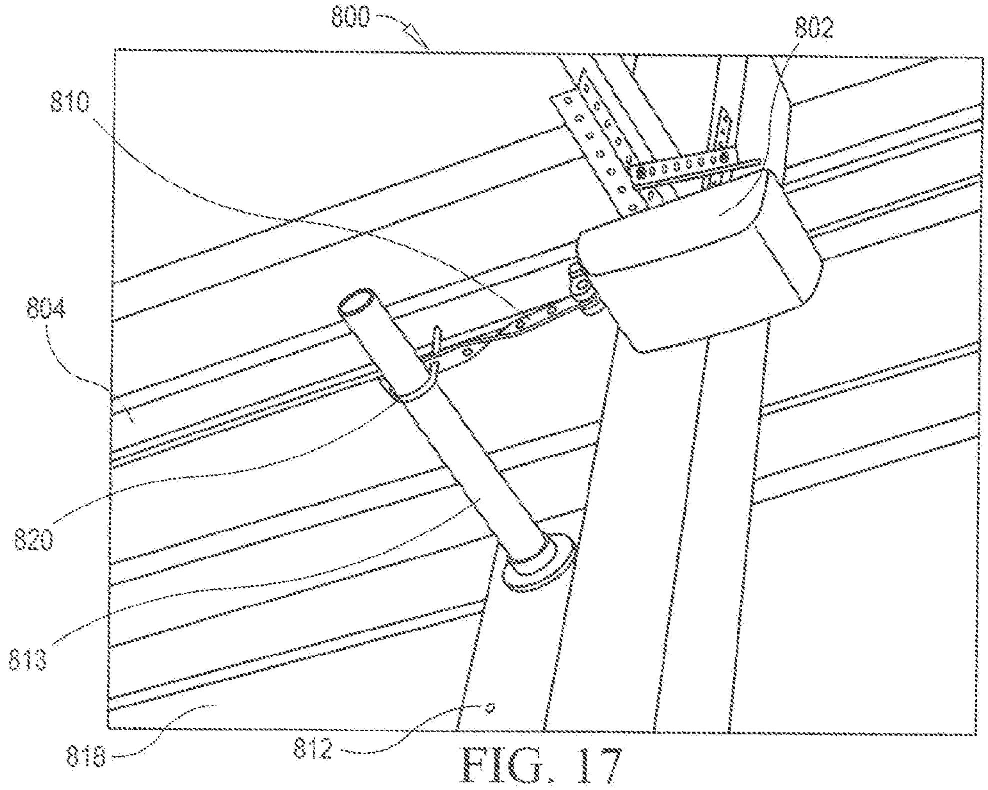
FIG. 17 illustrates a perspective view of an alternate mounted motor and linkage assembly in an embodiment of the present invention.
Figure 18:
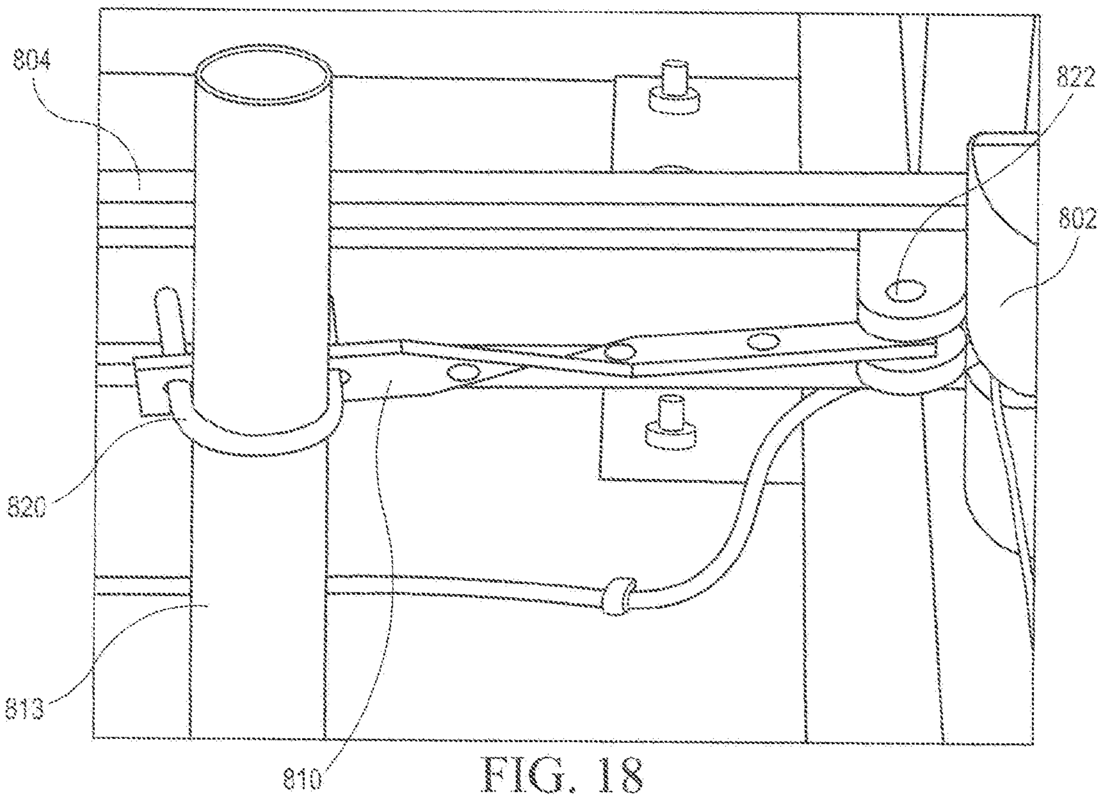
FIG. 18 illustrates a close-up view of a linkage assembly in an embodiment of the present invention.

In an alternate embodiment of the present invention, illustrated in FIGS. 17-18, system 800 is illustrated and described herein. System 800 is similar to system 700, as described above and illustrated with respect to FIGS. 15 and 16, except a motor 802 may be movably interconnected with a track 804, wherein the track 804 faces downwardly and the motor 802 is interconnected therewith from the underside thereof. Thus, the motor 802 may traverse the track 804 on the underside of the track 804. This configuration may aid in keeping debris and other items from falling within the track 804 and interfering with the proper functioning thereof. The motor 802 may link with an extension bar 813 via a bracket 810 that extends from the motor 802 (or a housing surrounding the motor 802) and links with the extension bar 813 via U-shaped bracket 820. The extension bar 813 may be bolted or otherwise connected to a door panel 812 for moving the door panel 812 open and closed over a door opening 818.

FIG. 18 illustrates a close-up view of the extension bar 813 rigidly connected to the bracket 810 via the U-shaped bracket 820. As illustrated, the bracket 810 may be bolted to the motor 802 via bolt 822, which may engage the motor 802, the housing thereof, and/or the carriage (not shown) that may be disposed within the track 804, as apparent to one of ordinary skill in the art. Thus, only the track 804 may be interconnected with the building, and may hang over the door opening 818 and extend to the sides thereof as necessary to provide necessary clearance for the track 804 and the motor movably connected thereto. Any bracket system may be utilized for rigidly holding the track 804 thereabove as apparent to one or ordinary skill in the art.

FIG. 31 illustrates an alternate embodiment of the present invention, of a bracket 850 that may be utilized to connect between a motor on a track (not shown, but substantially similar if not the same as the motor 802 described above with respect to FIGS. 17 and 18), and a door 852 that may be horizontally slidable and openable via the motor. The bracket 850 may be bolted or otherwise rigidly disposed on a leading edge of the door 852 via bolts 854 disposed through the bracket 850 and into the door 852. The bracket 850 may have a length that allows an arm 856 to be attached thereto on an end of the bracket 850 via bolts 858 to the bracket 850, but a distance from the door 852 so that the motor on the track (not shown) may move the bracket 850 via the arm 856 and, thus, move the door 852. As illustrated in FIGS. 15-18, the motor and track may be set a distance from the door 852 and above the door 852 to provide full clearance for equipment to utilize the full height of the opening when the door 852 is opened.

The bracket 850 may further have a rigid support flange 860 extending therefrom, disposed at roughly a right angle to the face of the bracket 850 for providing further support on the door 850. Specifically, the rigid support flange 860 is illustrated in FIG. 32 as a triangular-shaped element that may be bolted to the inside face of the door 852 via bolts 862 to sufficiently and rigidly hold the bracket on the door 850, allowing the bracket to move the door 850 when moved by the motor (not shown).

The bracket 850 may further have a bend or curved section 864 therein to minimize any deflection of the bracket 850 due to the heavy load of moving the door 850. The bend or curved section 864 preferably provides additional rigidity and to ensure that the connection point for the arm 856 is somewhat removed from the remainder of the bracket. Thus, for a bifurcating door system, two brackets as described herein may be utilized to move both door panels, and the bend or curved section 864 ensures that the bolts 858 do not contact each other on the two respective brackets when the door panels are in the closed configuration. It should be noted that for a bifurcated door system, two brackets utilized may be mirror images of each other, providing the ability to move the door panels open and closed as desired, and controlled by two motors (not shown).

FIG. 35 illustrates a still further alternate embodiment of the present invention, of a bracket 900 that may be utilized to connect between a motor on a track and a door (not shown) that may be horizontally slidable and openable via the motor. The bracket 900 may be substantially similar to bracket 850, described above with reference to FIGS. 31 and 32, with some variations, as described in more detail below.

The bracket 900 may be bolted or otherwise rigidly disposed on a leading edge of the door via bolts disposed through the bracket 900 and into the door. The bracket 900 may have a length that allows an arm to be attached thereto on an end of the bracket 900 via bolts to the bracket 900, but a distance from the door so that the motor on the track (not shown) may move the bracket 900 via the arm and, thus, move the door 900, substantially as described above with reference to FIGS. 31 and 32.

The bracket 900 may further have a rigid support flange 910 extending therefrom, disposed at roughly a right angle to the face of the bracket 900 for providing further support on the door. Specifically, the rigid support flange 910 is illustrated in FIG. 35 as a triangular-shaped element that may be bolted to the inside face of the door via bolts to sufficiently and rigidly hold the bracket 900 on the door, allowing the bracket 900 to move the door when moved by the motor (not shown).

The bracket 900 may include a bar 904 extending from the support flange 910, allowing the arm (not shown) to be attached to an end 906 thereof. The bar 904 may extend from a location on the support flange 910 that may be inset a distance from the edge of the support flange 910 to ensure that the bar 904 does not contact another bracket in a bifurcated door system, or anything else. The bar 904 may preferably be made from rectangular tubing, although any material may be utilized as apparent to one of ordinary skill in the art.

The end 906 of the bracket 900 may attach to an arm extending to a motor, as described above with reference to FIGS. 31 and 32. A plurality of apertures may be provided for attaching the arm thereto, to ensure that the arm lines up adequately with the bracket, as needed.

The bracket 900 may further have a bend or curved section 914 therein to minimize any deflection of the bracket 900 due to the heavy load of moving the door. The bend or curved section 914 preferably provides additional rigidity and to ensure that the connection point for the arm is somewhat removed from the remainder of the bracket. Thus, for a bifurcating door system, two brackets as described herein may be utilized to move both door panels, and the bend or curved section 914 ensures that the bolts do not contact each other on the two respective brackets when the door panels are in the closed configuration. It should be noted that for a bifurcated door system, two brackets utilized may be minor images of each other, providing the ability to move the door panels open and closed as desired, and controlled by two motors (not shown).

In an alternate embodiment of the present invention, bracket 950 is illustrated in FIGS. 36A, 36B and 36C, illustrating bracket that is similar to the bracket 900, described above with reference to FIG. 35, but having a rotatable bar 954 linking a triangular-shaped rigid support flange 960, firmly bolted or otherwise attached to an upper leading edge corner of a door, and an arm attached to a motor on a track (not shown) that may move the rotatable bar 954 and the triangular-shaped rigid support flange 960 and, hence, the door it is attached to. Thus, the door may open and close via the motor on the track (not shown) via the bracket 950, as described herein.

The rotatable bar 954 may have bends 956, 958 at a roughly ninety-degree angle on both a first side and a second side, respectively. The bend 956 may be rotatably attached to the triangular-shaped support flange 960, and the bend 958 may be rotatably attached to the arm and motor assembly (not shown). The bend 958 may include a bolt 964 for rotatably connecting to the arm/motor assembly, as illustrated in FIGS. 36A and 36C. The bend 956 may include a bolt or other connector (not shown) that may be disposed through the triangular-shaped support flange 960 and into sleeve 966, disposed on a back side of the support flange 960, thereby holding the bolt or other connector in place.

Thus, the rotatable bar 954 may generally be disposed downwardly, as illustrated in FIGS. 36A, 36B and may move via arm/motor assembly (not shown) to move the flange and, hence, the door attached thereto. The bracket 950 disclosed in this embodiment may be particularly useful for single doors that close across the entire face of a building opening. The rotatably bar 950 may engage door jambs on either side of the opening and may thus allow for either full opening and full closure of the door upon engagement with the jambs. Specifically, if a door opens from left to right (as viewed from inside the opening (in the same manner as the view shown in FIG. 36C, the bracket 950, linking the door to the arm/motor assembly, may be opened and travel in the right direction. Upon engaging the door jamb on the right of the door opening, the rotatable arm 954 may rotate to the left, as illustrated in FIG. 36C, thereby allowing the door attached thereto to open completely due to the rotationg of the rotatable arm 954. Thus, the rotatable arm may engage around the door jamb, and the arm/motor assembly may pull the door wider than if the rotatable bar was locked into place.

Alternatively, if the door closed over the opening, traversing from right to left across the door opening, the rotatable arm would rotate toward the right when engaging the door jamb on the left side of the door, causing the door to close completely, and furthermore overlap slightly over the door jamb, creating a better closure.

To aid the rotation of the rotatable arm on each of the door jambs may be a triangular ramp that may be placed on the door jamb, the triangular ramp mounted at a location to engage the rotatable bar 954. Preferably, the ramp may be several inches tall, such as about 6-8 inches, and may have a base that may be about 2-3 inches. The long edge of the triangular ramp may be attached to the wall, and when the rotatable bar 954 engages the ramp, the ramp may help aid the rotatable bar 954 in rotating, providing an easier movement of the rotatable bar 954 while in motion. Thus, the rotatable arm 954 may engage the ramp while the bar 954 is disposed downwardly, and as the bar moves from left to right, the ramp may aid the bar 954 to rotate upwardly ninety degrees (as shown in FIG. 36C, and the bar traverse over the entirety of the ramp until the bar 954 finally ends contacting the jamb. Thus the positioning of the ramp is such that the uppermost portion of the ramp is disposed at the same vertical level as the rotatable bar 954 when the rotatable bar 954 is disposed at a ninety degree angle, where being disposed downwardly is zero degrees.

Preferably, the brackets 850, 900 and 950 are made from suitable durable material that is relatively strong and provides minimal bending or deflection when in use. Preferably, the brackets 850, 900 and 950 are made of steel. In a preferred embodiment, the thicknesses of the brackets 850, 900 and 950 are about ¼ inch steel plate. More preferably, the triangular support flanges 860, 910 and 960 may be ⅛ inch steel plate. Of course, it should be noted that the relative thicknesses of the brackets 850, 900 and 950 and the triangular support flanges 860, 910 and 960 may be any suitable thickness apparent to one of ordinary skill in the art.

A benefit of brackets 850, 900 and 950 is that they may preferably allow full or nearly full horizontal opening of the doors all the way to the door jamb, yet provides sufficient rigidity and strength to move the doors via the motor mounted thereabove. Many bifurcated doors may have an external flap, known as lap trim, that may cover the space between the door panels when in the closed configuration. The brackets 850 and 900 may be utilized without interfering with the external flap. An internal flap may be found on many doors as well, but in this situation, the internal flap may require cutting away so that the bracket is not in the way of the external flap.

It should also be noted that all holes for receiving bolts may preferably be recessed so that the bolts sit flush against the brackets 850, 900 and 950 and do not interfere with other components, such as another bracket on another door panel in a bifurcated door system.

Figure 19:
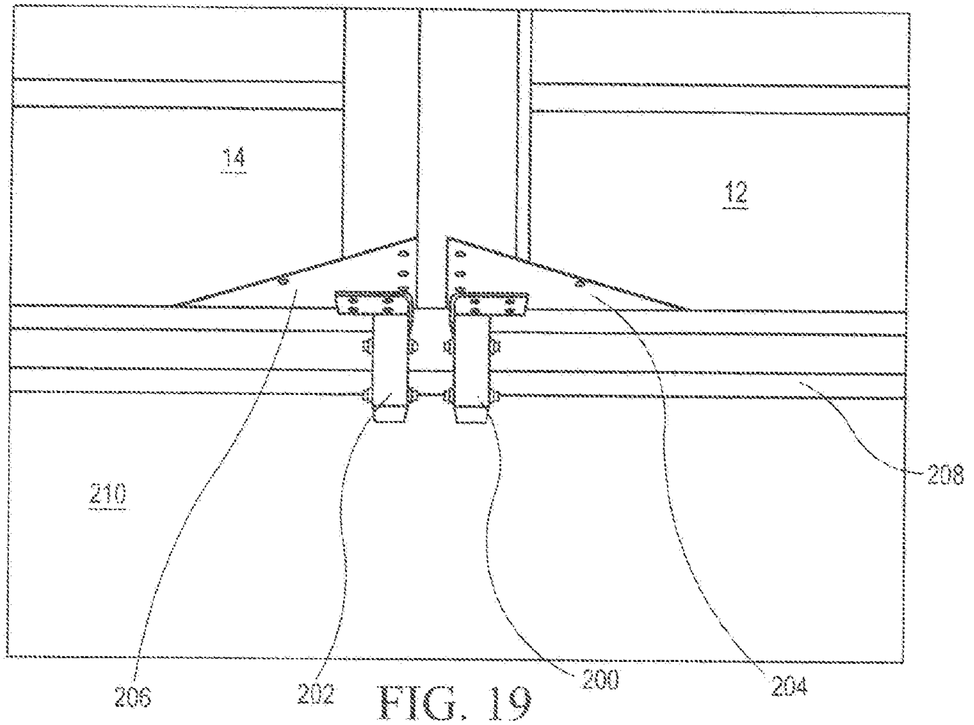
FIG. 19 illustrates a top view of a leading edge system for a bifurcated sliding door in an embodiment of the present invention.

Now turning to an alternate embodiment of the present invention, various embodiments of the leading edge system 104 (as shown in FIG. 2) is illustrated in FIGS. 19-27. Specifically, FIG. 19 illustrates a top view of trucks 200, 202 attached to brackets 204, 206 at or near the bottom of leading edges 110, 112 of the two panels 12, 14 of the bifurcated door 16, as illustrated in FIG. 3. The trucks 200, 202 may engage a track 208 that is rigidly connected with the ground. For example, the track 208 may be disposed over a concrete slab 210 that may be on or in the ground at the opening 18. The track 208 may be rigidly connected with the concrete slab 210, thereby keeping the two door panels 12, 14 in alignment due to the interaction of the trucks 200, 202 with the track 208. However, the track 208 may be connected directly with the ground, or may be attached to any other material to provide rigid positioning of the track laterally across the entrance 18, as apparent to one of ordinary skill in the art. In an embodiment, the track 208 may be bolted into the concrete slab 210. In an alternate embodiment, the track 208 may be welded to a metal edge guard (not shown) rather than secured via bolts into the concrete slab 210.

Figure 20:
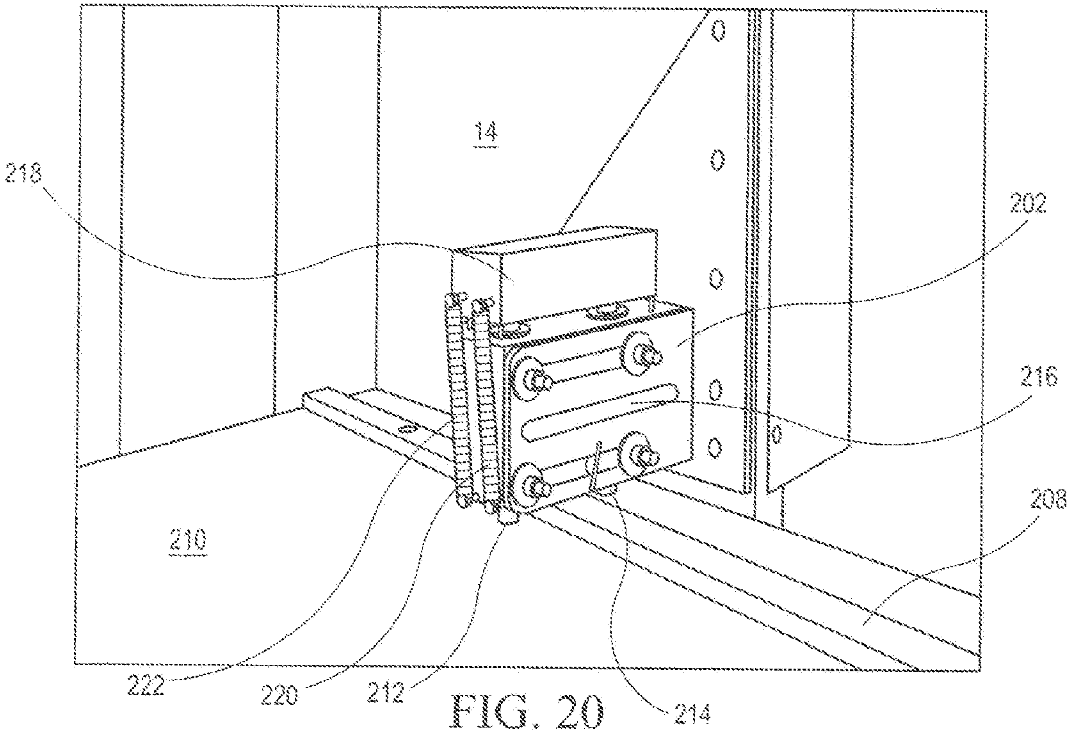
FIG. 20 illustrates a close up perspective view for engaging a truck and a track in the leading edge system in an embodiment of the present invention.
Figure 21:
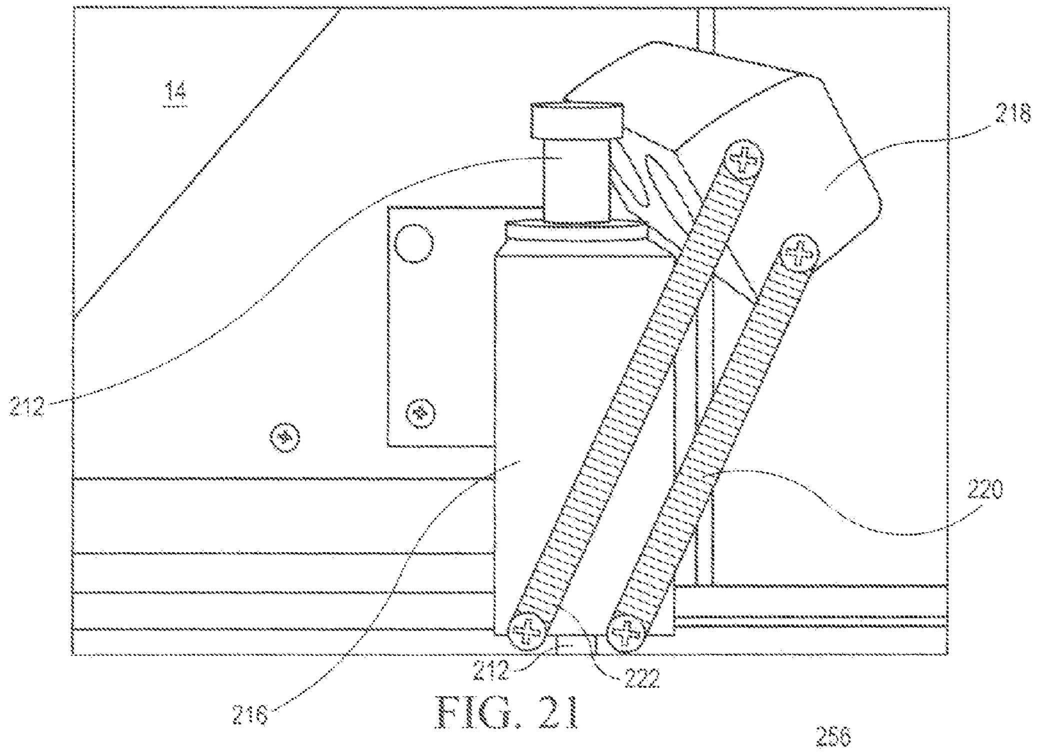
FIG. 21 illustrates a close up view of the truck showing internal components thereof in an embodiment of the present invention.

FIG. 20 illustrates a perspective view of the truck 202 engaged with the track 208. Generally, the truck 202 may engage the track 208 keeping the panel 14 of the door 16 in alignment. It should be noted that although the truck 200 is not illustrated in FIG. 20, the truck 200 may be constructed in the same or a similar way as the truck 202, and may engage the track 208 in a same or similar way. The truck 202 may comprise two pins 212, 214 disposed on opposite sides of the track 208, thereby restricting movement of the door panel 14. As illustrated in FIG. 20, the truck 202 may be made of a first block 216 having the pins 212, 214 disposed thereunder, and a cap block 218 fitted above the pins 212, 214 and held in place via tension springs 220, 222. As illustrated in FIG. 21, the cap block 218 is partially removed to show the pin 212. Of course, the truck 202 may be rigidly interconnected with the panel 14 of the door 16 via brackets, as illustrated.

The tension springs 220, 222 may allow the pins 212, 214 to move vertically as the truck 202 traverses with the door panel 14 when opening and/or closing the same. Therefore, if there are imperfections in the concrete slab 210, the pins may move downward and/or upward to follow the contour of the concrete slab 210, yet still provide engagement with the track 208 to ensure alignment of the door panel 14 when opening and/or closing.

Alternatively, the track 208 may be a depression, such as a groove, an extended valley or other like depression, instead of an upwardly disposed strip, as shown in FIGS. 19-21. Therefore, one or more pins (not shown) may be disposed within the depression, thereby holding the panels 12, 14 of the door 16 in alignment. However, it is preferable to utilize an upwardly disposed strip, as illustrated in FIGS. 19-21, since a depression may be prone to fill with debris.

Figure 22:
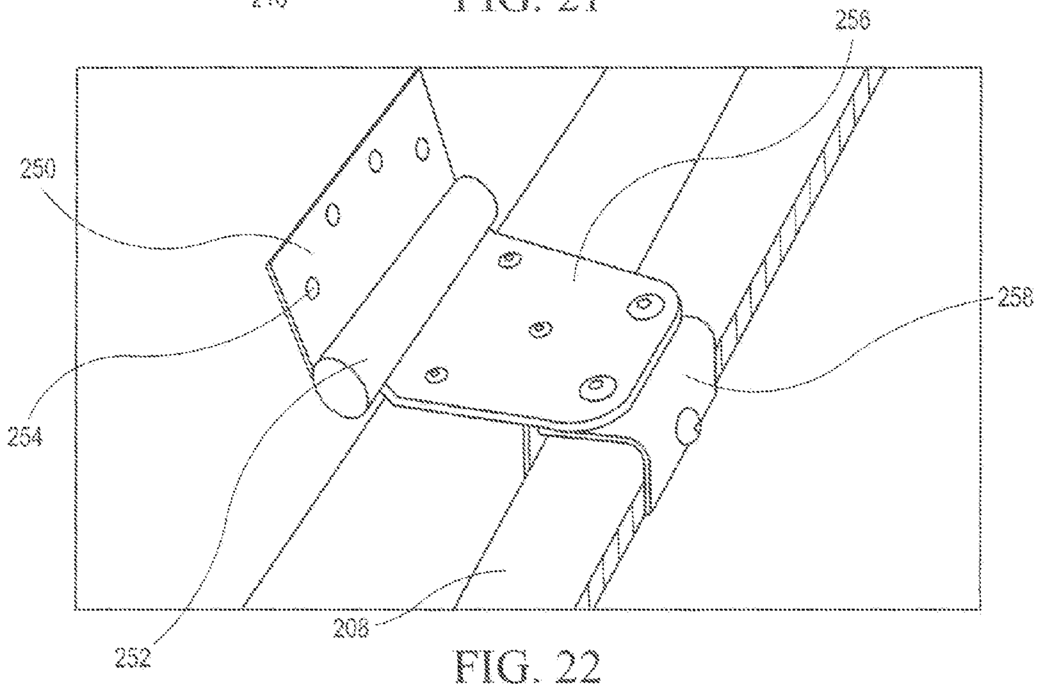
FIG. 22 illustrates a perspective view of an alternate embodiment of a truck in an embodiment of the present invention.
Figure 23:
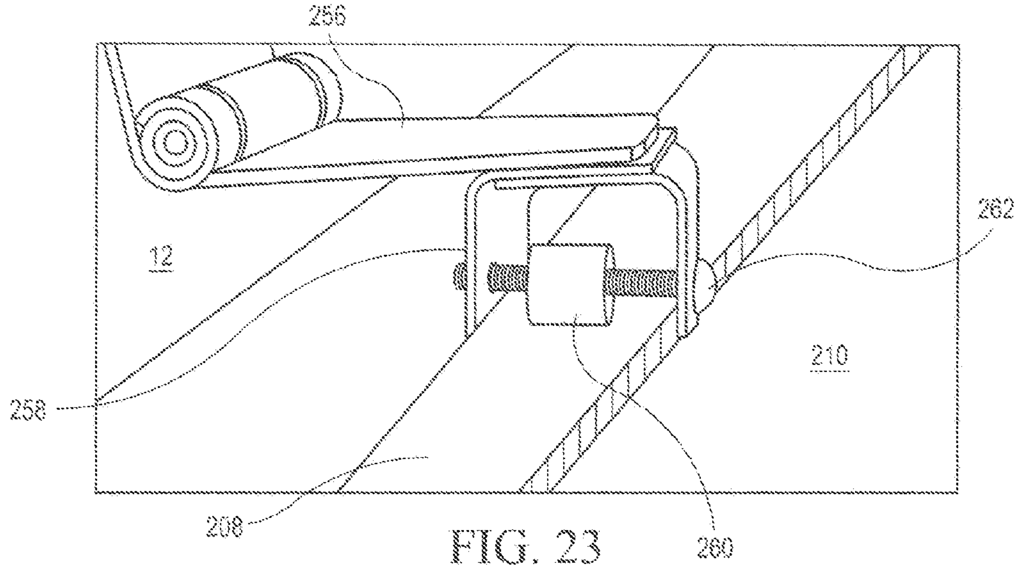
FIG. 23 illustrates a side view of the alternate embodiment of the truck engaged with a track in an embodiment of the present invention.
Figure 24:
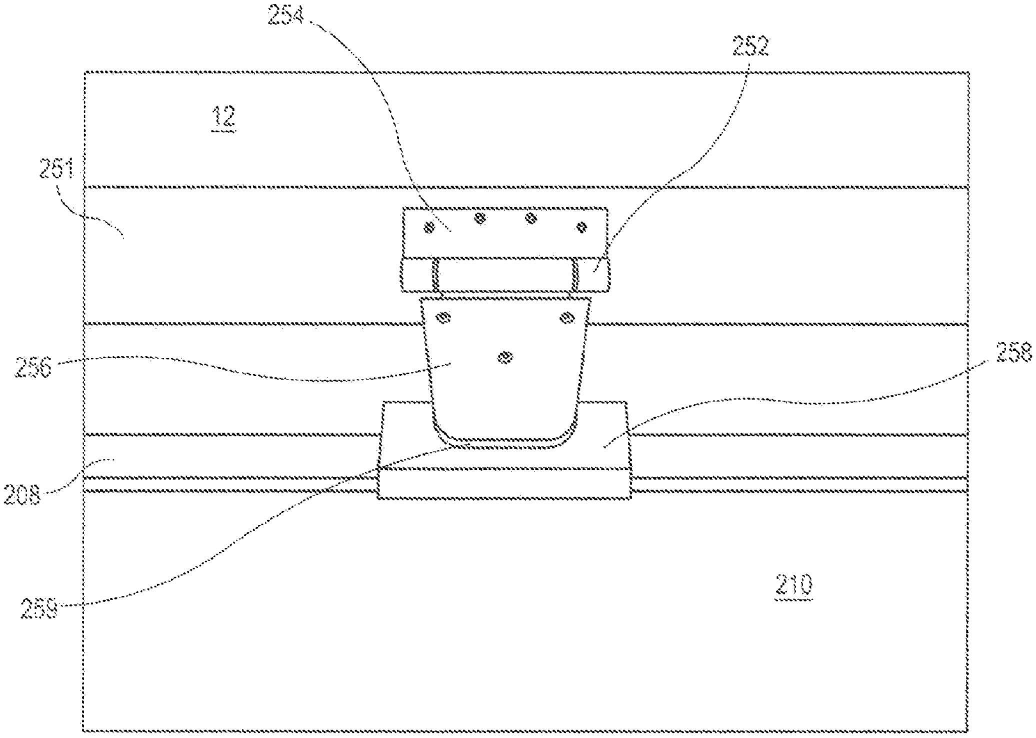
FIG. 24 illustrates a perspective view of a truck engaged with a track in an alternate embodiment of the present invention.

In an alternate embodiment of the present invention, FIGS. 22-24 show an alternate embodiment of a truck 250 of the present invention. The truck 250 may include a spring-loaded hinge 252 interconnecting a bracket 254 and a base piece 256. The spring-loaded hinge 252 may bias the base piece 256 downwardly. A U-shaped piece 258 may be interconnected with the base piece 256, and may be disposed in a downward configuration. The U-shaped piece 258 may engage the track 208 in a similar manner as the trucks 200, 202, illustrated in FIGS. 19-21. FIG. 23 illustrates a side view of the truck 250 further illustrating a roller 260 disposed within the U-shaped piece 258 via a bolt 262 for engaging the roller 260 with the track 208, and keeping the bottom edges of the U-shaped piece 258 a distance removed from the concrete slab 210 and, therefore, from engaging the concrete slab 210, allowing freedom of movement of the U-shaped piece 258 when the door panel 12 opens and/or closes. Preferably, the roller 260 keeps the bottom edges of the U-shaped piece 258 about ¼ inch from the concrete slab 210, although any distance is contemplated by the present invention and the disclosure should not be limited as described herein.

FIG. 24 illustrates an embodiment of the truck 250 disposed on a door panel 12, specifically on an elongated bottom door panel frame piece 251. The bracket 254 is preferably bolted or screwed to the frame piece 251, although the bracket 254 may be attached to the door panel 12 in any way apparent to one of ordinary skill in the art. The spring-loaded hinge may bias the base piece 256 downward onto the track 208, thereby engaging the U-shaped piece 258 to the track 208, thereby keeping the bottom of the door panel in proper laterally traversing trajectory as it traverses horizontally over the door opening. In this embodiment, the base piece 256 is shown as being welded to the U-shaped piece 258 via weld 259, and may therefore be extended relatively further from the door panel 12 than if bolted, as shown in FIGS. 22-23. Moreover, the track 208 may alternatively be welded to a metal edge guard (not shown) rather than secured through bolts into concrete, as described in the previous embodiments. However, it should be noted that the track 208 may be secured in any manner, such as, as previously disclosed, bolted or drilled into the concrete, and/or bolted to a wood threshold that may be positioned at the door opening. In many cases, however, the track 208 may simply be bolted to the concrete, as described herein.

Figure 25:
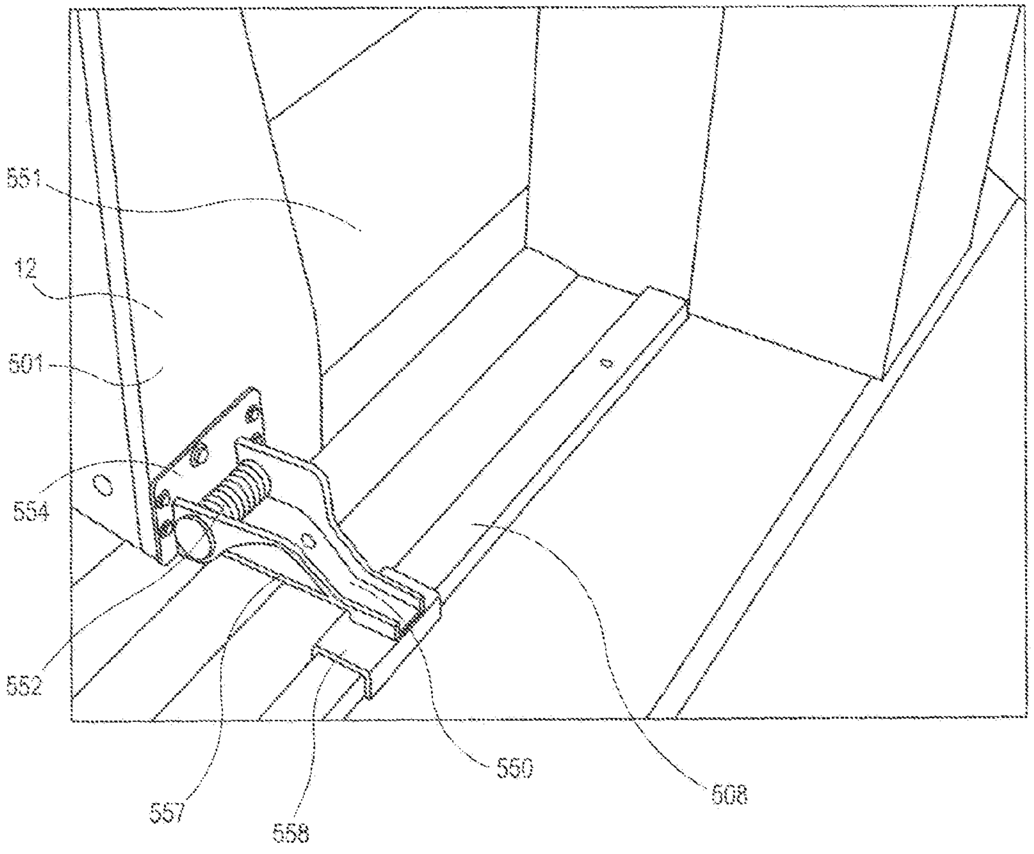
FIG. 25 illustrates a perspective view of an alternate truck engaged with a track in an embodiment of the present invention.

FIG. 25 illustrates an alternate embodiment of a truck 550 disposed on a door panel 12, specifically on an elongated bottom door panel frame piece 551 and/or on a vertical door frame piece 501 at or near its leading edge. The truck 550 may include a bracket 554 for mounting on the door panel frame piece 551 and/or the vertical door frame piece 501. The bracket 554 is preferably bolted or screwed to the frame piece 551 and/or the vertical door frame piece 501, although the bracket 554 may be attached to the door panel 12 in any way apparent to one of ordinary skill in the art. A spring-loaded hinge 552 may bias base piece 556 downward onto track 508 disposed and rigidly connected (via bolts or otherwise) to the ground, such as in the concrete thereof, thereby engaging U-shaped piece 558 to the track 508, thereby keeping the bottom of the door panel in proper laterally traversing trajectory as it traverses horizontally over the door opening. In this embodiment, the base piece 556 is shown as being welded to the U-shaped piece 558. In addition, the base piece 556 may be curved, but may include support strut 557 disposed therebeneath to provide additional support thereof. Moreover, the track 508 may alternatively be welded to a metal edge guard (not shown) rather than secured through bolts into concrete, as described in the previous embodiments. Advantageously, the truck 550 allows for mounting thereof on the door panel 12 in a location that is at or otherwise disposed very near the door's leading edge so that the door panel 12 may retract more fully, increasing the horizontal space of the opening through which equipment may pass through when fully opened.

Figure 33:
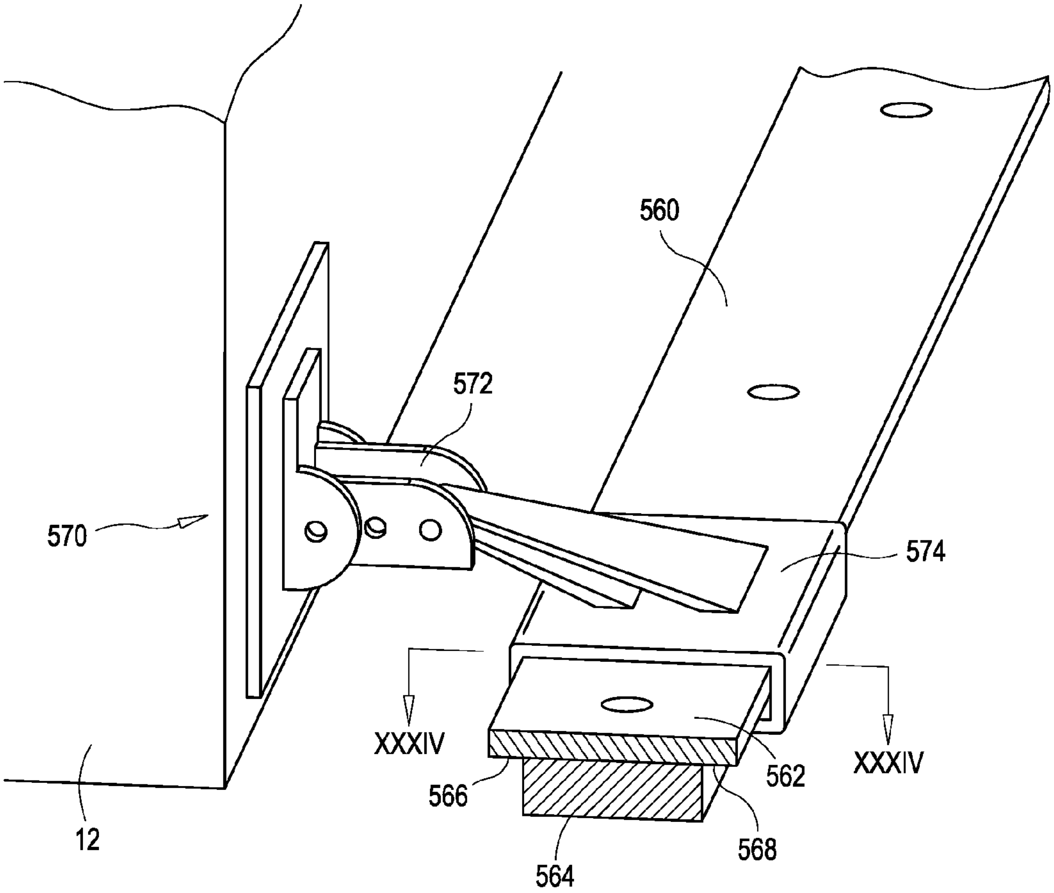
FIG. 33 illustrates an elevated side view of a track engaged with a truck on a horizontally-sliding door in an alternate embodiment of the present invention.
Figure 34:
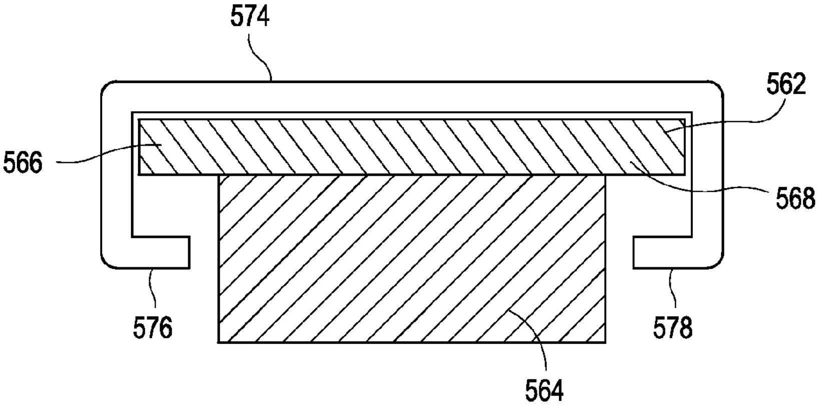
FIG. 34 illustrates a cross-sectional view of the track in an embodiment of the present invention.

FIG. 33 illustrates a still further alternate embodiment of the present invention of a track 560 that may be substantially similar to the tracks 208, 508, as disclosed above, except that the track 560 may include a top rail 562 disposed on a base 564, wherein the top rail includes a first flange 566 extending from one side and a second flange 568 extending from the second side of the base 564. A truck 570, disposed on the door panel 12, as illustrated in FIG. 33, may be fastened to the door panel 12 and may include an arm 572 extending therefrom and connecting to a C-shaped element 574 that may be disposed over the top rail 562 and engaged thereto. The C-shaped element, shown in cross-section in FIG. 34, may include extending portions 576, 578 that may restrict the movement of the C-shaped element 574 off of the top rail 562. As with the trucks disclosed above, the C-shaped element may be downwardly biased via a spring or the like, thereby generally keeping the C-shaped element on the track 560.

However, on windy days, the door panel 12 may have difficulty maintaining its alignment when opening and/or closing over a door opening. Therefore, the C-shaped element may restrict the movement of the door panel 12 and help keep the door panel 12 in alignment.

The track 560 may be bolted to the ground or cement that may be disposed thereunder. Moreover, the track 560 and its components may be made from any material apparent to one of ordinary skill in the art, such as metal, such as steel, plastic, or the like. Preferably, the top rail 562 is made of a metal, such as steel, or rigidity, durability and strength, while the base 564 may be made from a rigid thermoplastic that may be relatively lightweight, easily molded, yet strong enough to keep the track 560 fastened where desired.

The top rail 562 may have portions therein where the extending flanges 566, 568 are not present so that C-shaped element may be placed on the top track 562. Therefore, the C-shaped element may be placed thereon and/or removed as desired without full removal of the track 560.

Figure 26:
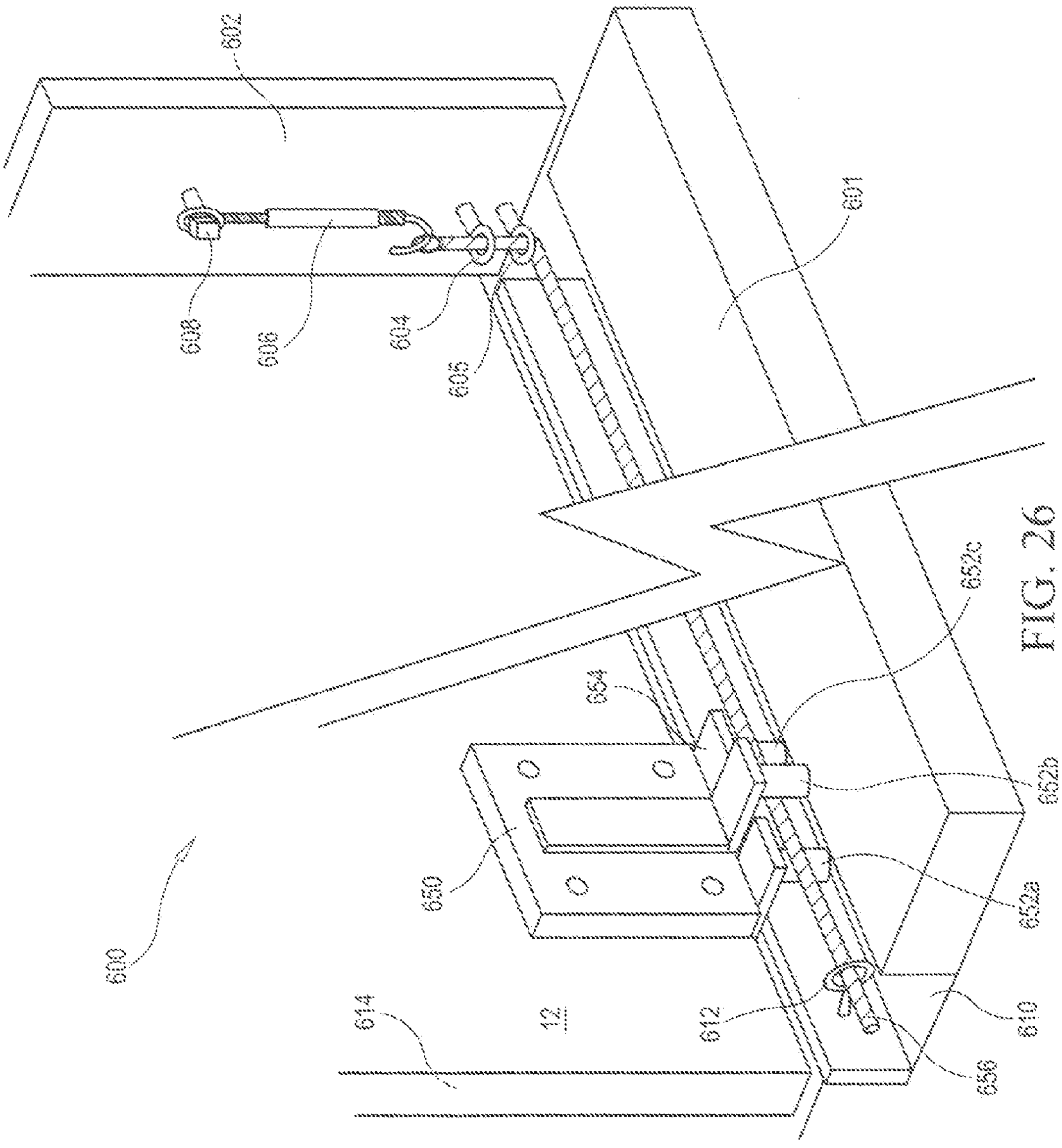
FIG. 26 illustrates a perspective view of an alternate system for guiding a door along a cable sunk within a trench wherein the alternate system is useful for buildings with dirt or stone floors, in an embodiment of the present invention.

In an alternate embodiment of the present invention, an alternate track system 600 is illustrated in FIG. 26. The alternate track system 600 may be utilized in situations where a track, as described above, cannot be utilized because the ground at the opening of the building is made of compacted dirt or stones. Specifically, a door panel 12 is illustrated that may be opened and/or closed over an opening to a building with a ground floor 601. Mounted on the door panel 12 may be a truck 650 via bolts, welded or otherwise rigidly and strongly attached to the door 12. A plurality of pins 652*a*, 652*b*, 652*c* may be disposed beneath a mounting member 654 on the truck 650 for engaging a cable 656 that may be disposed from a door jamb 602 across the opening formed in the building to a door jamb on the opposite side thereof (although the cable 656 is shown cut-off for purposes of illustration). The cable 656 may be interconnected to the door jamb 602 and arranged so as to be tightened across the entrance of the building. In the example shown in FIG. 26, the cable 656 may run through eyebolts 604, 605 and be interconnected with an end of a turnbuckle 606 rigidly connected to the door jamb 602 via bolt 608. Thus, the turnbuckle 606 may be tightened or loosened so as to influence the tightness of the cable 656 across the entrance.

In a preferred embodiment, the cable 656 may reside within a trench 610 disposed across the entrance to the building such that the pins 652*a*, 652*b* and 652*c* may engage the cable 656 and traverse the trench 610 when the door panel 12 opens and/or closes. Thus, the door panel 12 may stay in position as it traverses across the opening in the building, and the engagement of the truck 650 and its pins 652*a*, 652*b* and 652*c* with the cable 656 allows the bottom portion of the door to remain aligned.

The trench 610 generally maintains the cable 656 below the surface of the surrounding ground so that the cable is not and does not become a hazard for people and/or equipment that may traverse the trench 610. The space within the trench 610 may be generally wide enough to allow the pins 652*a*, 652*b*,

652*c* to stay in constant contact with the cable 656 so that the door 12 maintains its position as it traverses upon opening and closing thereof. Because the pins 652*a*, 652*b* and 652*c* continually traverse the trench 656, the trench 656 stays relatively free of debris as the pins 652*a*, 652*b* and 652*c* move rocks and dirt that may fall within the trench 656. Alternatively, a shield or guide (not shown) may be attached on either side of the truck 650 to push or otherwise move dirt and/or debris away from the pins 652*a*, 652*b* and 652*c* as it traverses through the trench 656, interconnected to the cable 656.

In a single door configuration, the cable 656 merely resides within the trench 610 and the truck 650 and its pins 652*a*, 652*b* and 652*c* traverse from one end of the entrance to the other, keeping the door aligned. An opposite eyelet and tightening device, such as a turnbuckle, may also be disposed on the opposite doorjamb. Alternatively, a single turnbuckle on the doorjamb 602 is provided, and the cable is merely tied off or otherwise connected to the doorjamb on the opposite end.

In a bifurcated door configuration, an eyelet 612 may be disposed within a mullion or other support beam that is sunk into the ground at the entrance of the building to provide a guide for the truck 650, ensuring that the leading edge of the door 614 aligns with the leading edge of the other door in the bifurcated arrangement as the doors meet in the middle of the opening. Specifically, another truck arrangement (not shown) may therefore be provided on the other door panel to guide the other door panel in the bifurcated configuration so that the doors meet in the middle of the opening.

Figure 27:
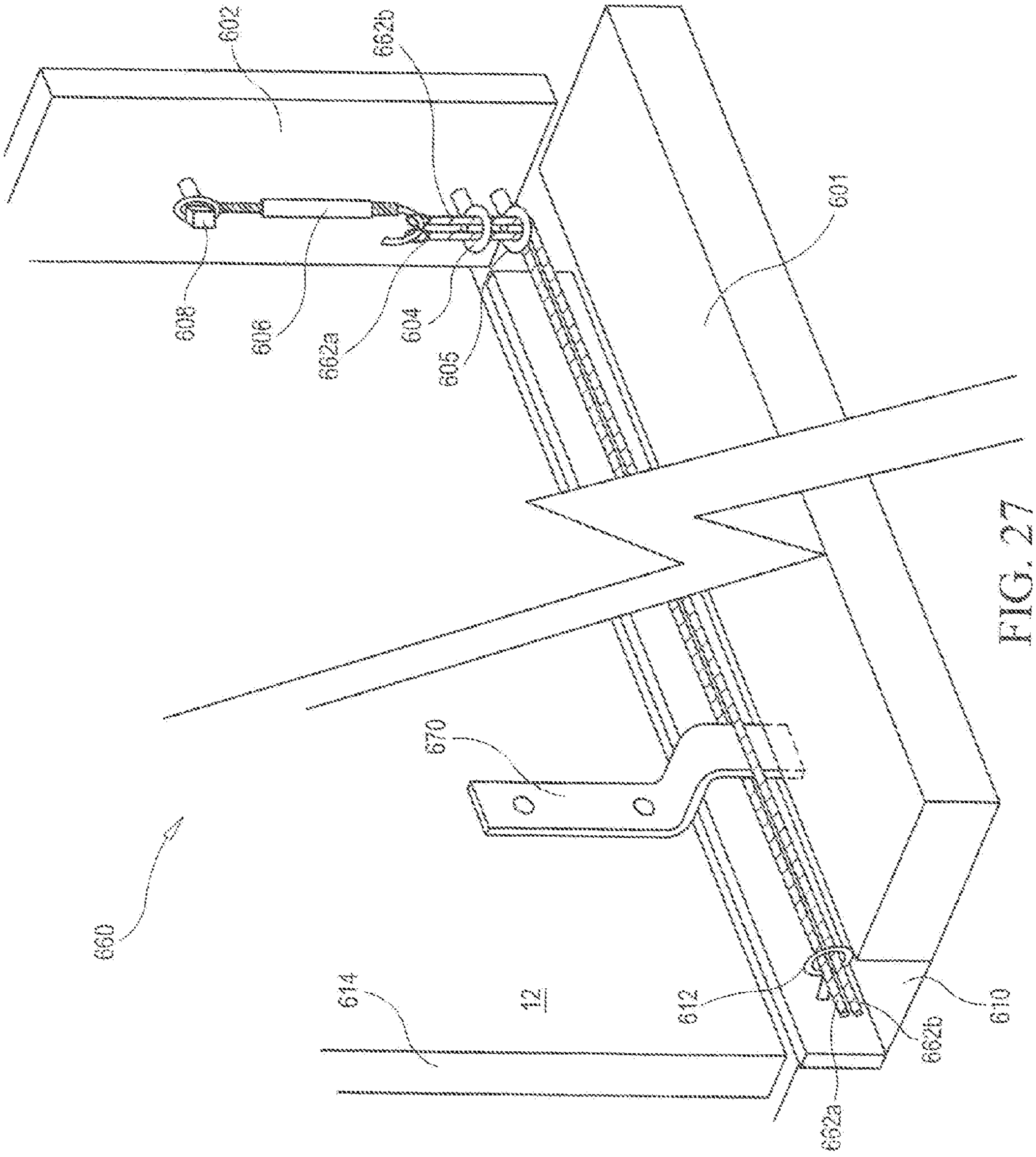
FIG. 27 illustrates a perspective view of an alternate system for guiding a door between a pair of cables within a trench in an embodiment of the present invention.

In an alternate embodiment, FIG. 27 illustrates an alternate system 660 in an embodiment of the present invention, similar to the system 600 illustrated and described above with respect to FIG. 26. As with the system 600, system 660 includes a door panel 12 and a door jamb 602 on a side thereof. A turnbuckle 606 may be bolted or otherwise connected to the door jamb 602 and a bottom end thereof may engage dual cables 662*a*, 662*b* that may run generally parallel and side-by-side through the trench 610. The dual cables 662*a*, 662*b* may run through eyebolts 604, 605, as previously disclosed with respect to single cable 656 disclosed above. However, instead of truck 650, a curved or angled downwardly disposed blade 670 may be bolted or otherwise rigidly connected or attached to the door panel 12 such that the downwardly disposed blade 670 may engage the dual cables 662*a*, 662*b* and may be disposed therebetween, such that the downwardly disposed blade 670 may keep the door panel 12 in alignment when traversing. The blade 670 may further keep the trench 610 free from debris by pushing through debris and/or by pushing debris out of the way. The turnbuckle 606 may be turned to tighten the dual cables 662*a*, 662*b* as needed. Alternatively, two turnbuckles, or other tightening devices, may engage the dual cables 662*a*, 62*b* independently so that each may be tightened independently as needed. Of course the dual cables 662*a*, 662*b* may run from one end of the door entrance to the other within the trench 610, and may be tied off. Alternatively, there may be one or more turnbuckles on the opposite end thereof engaging one or both of the dual cables 662*a*, 662*b*, as may be necessary. In addition, the eyebolt 612, or any other eyebolts, may rigidly hold the cables within the trench 610 at various points in the trench, but preferably near a centrally located mullion (not shown) in the case of a bifurcated door.

FIGS. 13 and 14 illustrate the trailing edge system 106, as shown in FIG. 3, in an alternate embodiment of the present invention. As described above, the trailing edge system 106 provides further security in maintaining the alignment of the two panels 12, 14 when laterally traversing the entrance 18 when opening and/or closing. The trailing edge system 106 provides alignment of the two panels 12, 14 at the edges 116, 118 of the entrance 18. Moreover, the trailing edge system 104 may automatically cinch the two panels 12, 14 of the bifurcated door 16 against the building 10 at the edges 116, 118 of the entrance 18 when the two panels 12, 14 of the bifurcated door 16 are in a closed configuration over the entrance 18.

Figure 28:
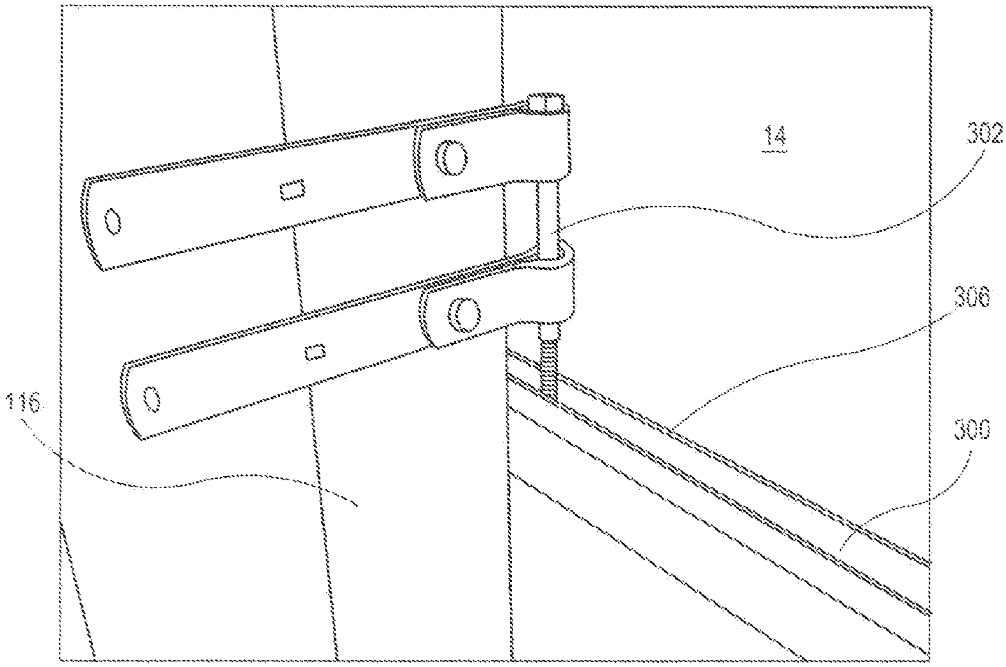
FIG. 28 illustrates a close up perspective view of a trailing edge system in an embodiment of the present invention.
Figure 29:
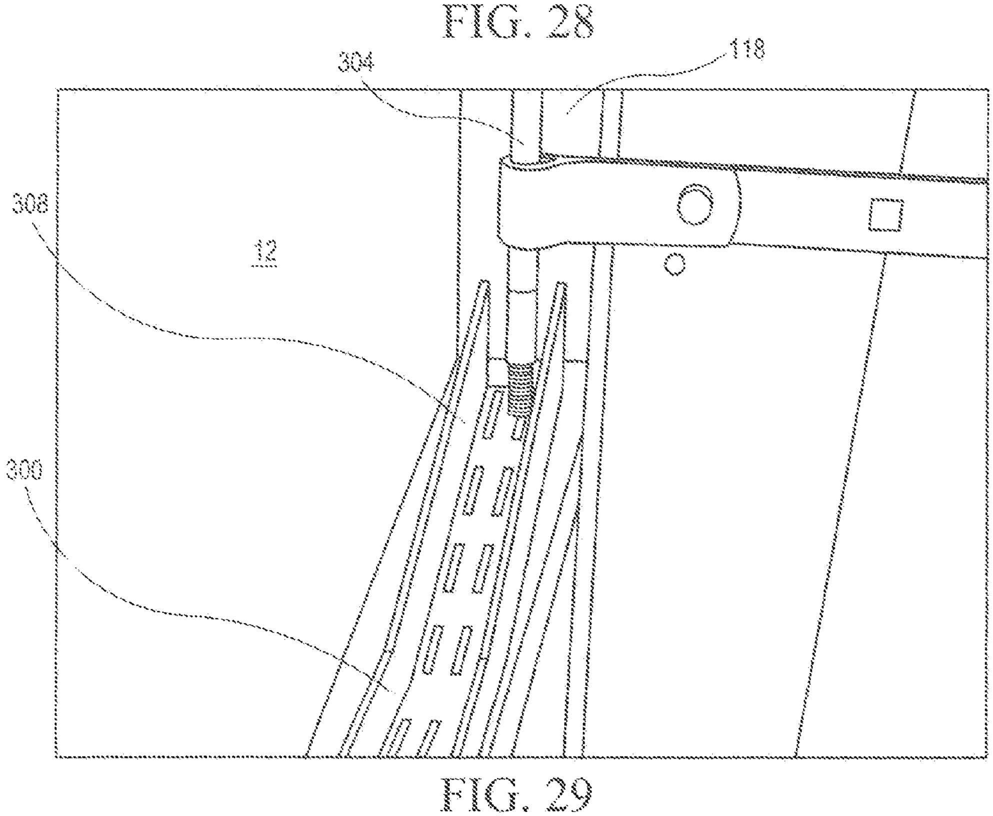
FIG. 29 illustrates an elevated close up perspective view of the trailing edge system in an embodiment of the present invention.

Specifically, the trailing edge system 106 comprises a U-shaped track 300 disposed open end upwardly and attached to an inside surface of the two panels 12, 14 of the door 16. For example, the U-shaped track 300 is shown disposed on door panel 14 in FIG. 28, while the U-shaped track 300 is shown disposed on door panel 12 in FIG. 29. More specifically, the U-shaped track 300 may be disposed on the upper surface of a support spline utilized to secure the structure of the two panels 12, 14 of the bifurcated door 16. In a single door panel configuration, the U-shaped track 300 may be disposed over the entire lateral distance of the single door panel. Pins 302, 304 may be downwardly disposed at the edges 116, 118 of the entrance 18 to engage the U-shaped track 300. The pins 302, 304 may, therefore, keep the two panels 12, 14 in alignment when opening and/or closing. Moreover, the U-shaped track 300 may have portions 306, 308 angled inwardly toward the inner surface of the two door panels 12, 14 at trailing edges of the door panels 12, 14. Therefore, when the two door panels 12, 14 are fully closed over the entrance 18, the pins 306, 308 may engage the angled portions 306, 308 and may cinch the two door panels 12, 14 of the door 16 against the edges 116, 118, effectively sealing the door panels 12, 14 to the building 10. The pins 302, 304 may be held in place via brackets, as illustrated in FIGS. 28 and 29. Moreover, the pins 302, 304 may be bolts having threaded bottoms for the engagement of nuts to move fully engage the U-shaped track 300, and provide better cinching of the same when the door 16 is fully closed.

Figure 30:
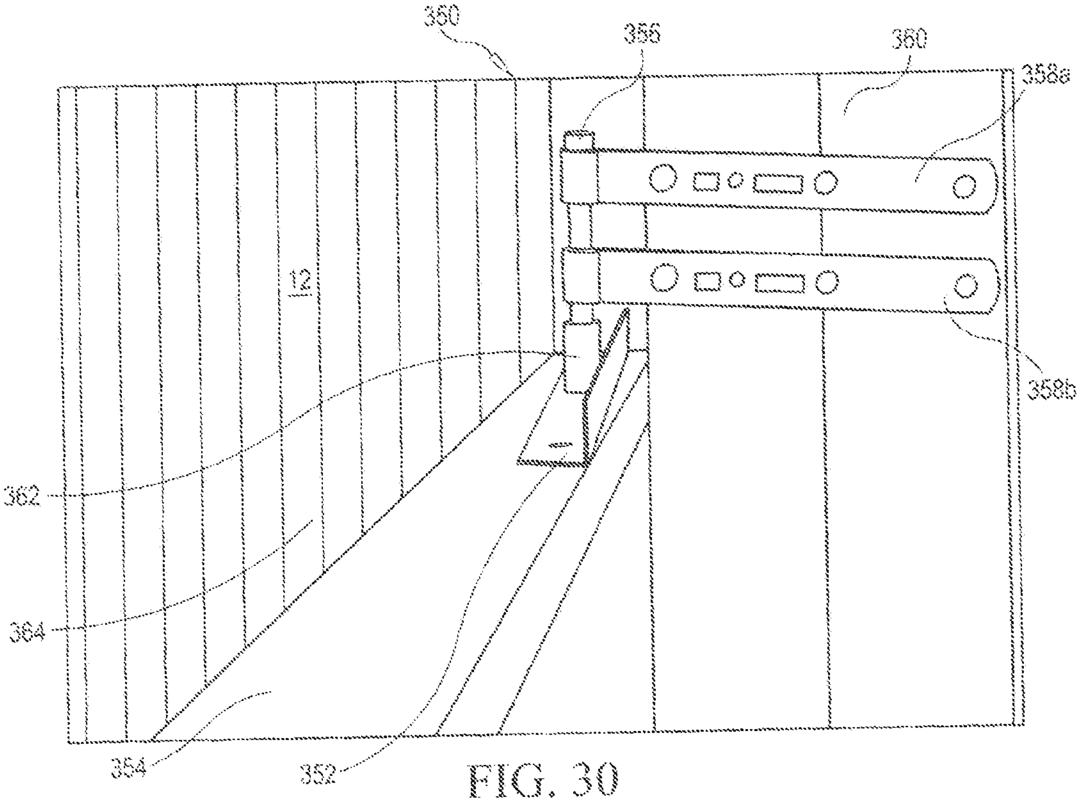
FIG. 30 illustrates a side view of an alternate trailing edge system in an embodiment of the present invention.

FIG. 30 illustrates an alternate embodiment of the present invention of a door cincher system 350. The door cincher system 350 may be similar to the door cincher as illustrated in FIGS. 28-29, described above. However, the door cincher system 350 may simply have an L-shaped bracket 352 disposed at or near a trailing edge of the door panel 12 on a support spline 354. The L-shaped bracket 352 may be angled inwardly toward the door panel 12 towards the trailing edge of the door panel 12. A pin 356, disposed downwardly and rigidly attached via one or more brackets 358*a*, 358*b* to a door jamb 360 may further have a bushing 362 and cap 364 for holding the bushing 362 thereon. The bushing 362 may rotate on the pin and may aid when the pin 356 engages the L-shaped bracket 352 as the door panel 12 traverses. As the door panel 12 closes over the door opening 18, the pin 356 may engage the vertically-disposed leg of the L-shape bracket 352, and the pin 356 may pull the door panel 12 toward the door jamb 360 cinching the door panel 12 to the building. Thus, the cinching system 350 may cinch the door panel 12 to the building without requiring a track running the horizontal length of the door panel 12.

In another embodiment of the present invention, a plurality of floor guides 1000 is illustrated in FIG. 37. Specifically, a floor guide aids a door 1002 disposed over an opening to a structure, to stay aligned. As illustrated in FIG. 37, the door 1002 may reside and traverse between the floor guides 1000 and a lip 1004, opening and closing over the opening to the structure. The floor guide 1002 may further restrict the door 1002 from moving outwardly such as if a strong wind blows the same, while the lip 1004 restricts the door from moving inwardly, such as due to a wind blowing into a structure. Thus, the door 1002 remains in alignment as needed to open and close over the opening of the structure.

The floor guide 1002 may be made from any material to have the required strength to hold the door 1002 in alignment. As illustrates in FIG. 37, the floor guide may be made from concrete, and may be molded or otherwise form integrally with the floor 1006 and the lip 1004 that may extend along the ground across the opening to the structure. Alternatively, the floor guide 1000 may be formed from any other material, such as plastic, rubber, metal, wood, composite, or any other material that provides the requisite strength to hold the door 1002 in alignment. In addition, the floor guide 1000 must be resilient to withstand the force of heavy equipment driving thereover, and resist weathering forces as well, such as wind, rain, snow, ice and other like weather.

The floor guide 1000 allows the door 1002 to remain in alignment without fixing a deep and uninterrupted trench along the structure opening. A trench may not be suitable for horizontal-opening doors, as they may collect debris and may be difficult to clean, interrupting the normal operation of the door 1002. The floor guide 1000 allows the area around the door opening to be cleaned, remaining free of material that may impede the movement of the door 1002.

As illustrated in FIG. 38, a modular floor guide 1010 is illustrated. The modular floor guide 1010 may be utilized at a door opening requiring restricted movement of a door, but may not be able to utilize a formed, concrete floor guide, as illustrated in FIG. 37. In addition, there may already be a rigid floor at the door opening location, and adding a floor guide 1010 may be easy to do. The floor guide 1010 may have a roughly trapezoidal shape, with a rear side 1012, right and left sides 1014, 1016, angled sides 1018, 1020 and a door contacting side 1022. In general, the door contacting side 1022 may be positioned such that the horizontal-sliding door may traverse over the door contacting side 1022, and contact with the door contacting side 1022 may keep the door in alignment as it traverses horizontally.

The floor guide 1010 may further comprise kick-out portions 1024, 1026 disposed in recesses 1028, 1030 in the door contacting side 1022 to provide an extended contact surface from the floor guide 1010. The kick-out portions 1024, 1026 may be made from a resilient material that may be shaped or cut to a particular size to jut away from the floor guide 1010 a certain distance to optimize the alignment of the horizontally sliding door. In addition, kick-out portions 1024, 1026 may further be used to ensure that a first door portion of a bifurcated horizontally-sliding door clears any portion of a second door portion of a bifurcated horizontally-sliding door, such as laptrim that may be disposed on a leading edge of a first door portion of a bifurcated horizontally-sliding door.

A plurality of slots 1032 may be disposed within the body of the floor guide 1010 to stake, bolt or otherwise fix the floor guide 1010 to a floor, whether the floor is dirt, gravel, concrete, metal, or another material. The slots 1032 allow the positioning of the floor guide 1010 after bolts are disposed therein. Alternatively, the slots 1032 easily allow for the proper placement of the floor guide on a floor.

Figure 39:
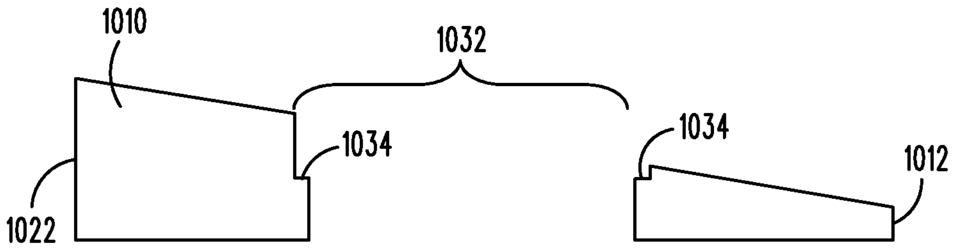
FIG. 39 illustrates a cross-sectional view of a floor guide along line XXXVIII-XXXVIII XXXVIII-XXXVIII in an embodiment of the present invention.
Figure 40:
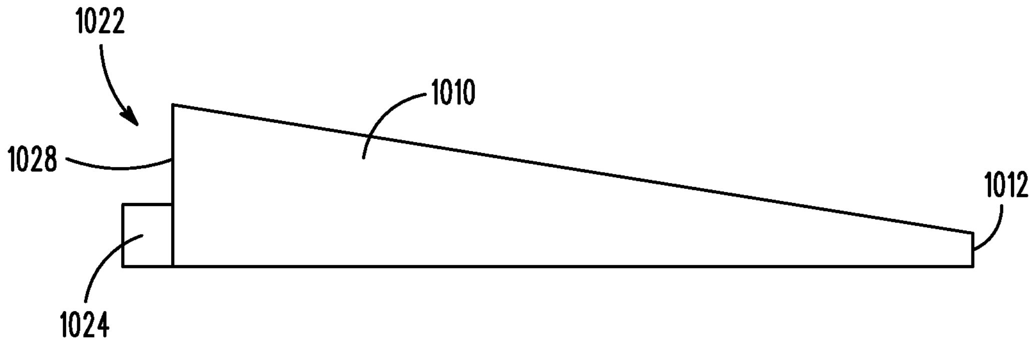
FIG. 40 illustrates a cross-sectional view of a floor guide along line XXXIX-XXXIX in an embodiment of the present invention.

FIGS. 39 and 40 illustrate cross-sectional views along lines XXXIX-XXXIX and XXXX-XXXX in FIG. 38. FIG. 39 illustrates a cross-sectional view, illustrating the rear side 1012, and the slot 1032 disposed therein. The slot may have a lip 1034 therein for holding a bolt therein, inset within the floor guide 1010. As shown, the floor guide 1010 may be slanted from the rear side 1012 upwardly to the door contacting side 1022. The slant from the rear side 1012 to the door contacting side 1022 may present a profile that may easily allow heavy machinery to drive thereover without catching the same, and the slant may act as a ramp for the machinery as it traverses thereover.

FIG. 40 illustrates a cross-sectional view along line XXXX-XXXX, showing kick-out portion 1024 jutting from recess 1028 to provide an additional door contacting surface in situations requiring the same. The kick-out portion may be bolted, adhered, or otherwise rigidly disposed within recess 1028 to prevent movement of the same, especially when a door traverses thereover.

Figure 41:
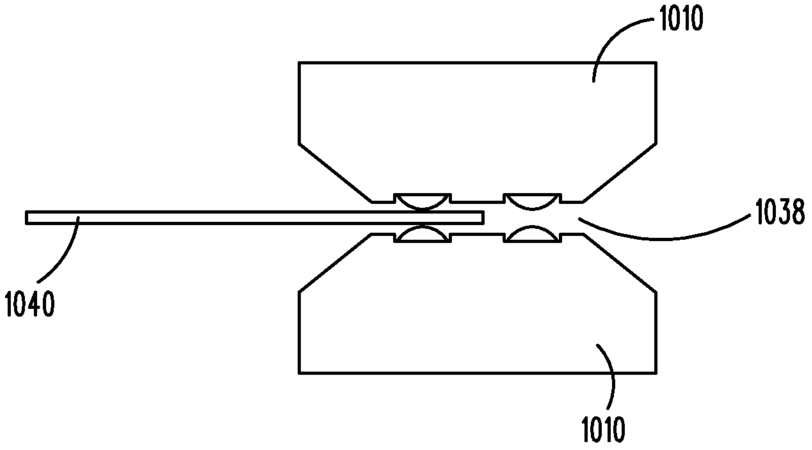
FIG. 41 illustrates a top view of a pair of floor guides disposed adjacently, forming a track for a horizontally-sliding door in an embodiment of the present invention.

In a preferred embodiment, a floor guide may be aligned a distance from a lip, as illustrated in FIG. 37, to provide a track for the horizontally-sliding door to traverse. However, in certain circumstances, there may not be a lip with which a floor guide, as described herein, may be aligned to form the track. In such a situation, two floor guides may be turned to face each other, each with its door contacting surface facing the other's door contacting surface, to provide the track necessary to keep the door in alignment. As illustrated in FIG. 41, a first floor guide 1010 and a second floor guide 1010 are disposed adjacently, with the door contacting sides facing each other, forming a track 1038 for a door 1040 to traverse. Moreover, it is preferred that at least one floor guide be utilized in the center of a door opening, especially where a bifurcated door may come together. Any other number of floor guides may be utilized as necessary to prevent the door from misaligning.

Moreover, it should be noted that a spacer may be provided having the same general shape as the floor guides, as described herein, which may be disposed beneath a floor guide to add height to the floor guide in situations where the floor guide requires additional height to properly maintain the door in proper alignment.

The control of the motors of the various embodiments of the present invention may be accomplished using hardwired control buttons and/or remote control button, as is apparent to one having ordinary skill in the art. Of course, limit switches may further be provided to ensure that the two panels 12, 14 of the bifurcated door 16 open and close fully and stop where appropriate. Moreover, certain safety features, such as pressure sensitive regions and/or optical detectors, may be utilized to ensure that an individual is not hurt by the opening and/or closing of the door 16. For example, electronic eyes, lasers, or other detectors may be provided at various elevations of the door to effectively stop and/or open the door 16 during an emergency, such as if a vehicle or an individual is between the panels 12, 14 when the panels 12, 14 are closing. As noted above, the doors may further include release pins 168, 170 having chains for a user to pull for disengaging the carriages 154, 156 from the tracks 158, 160 for manual opening and/or closing of the door 16, such as, for example, during a power outage or the like.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An automatic door moving system comprising:

a building having a horizontally-moving door panel disposed over an entry opening, the entry opening bounded by a first side and a second side, a header on the top thereof, and a bottom, wherein the horizontally-moving door panel opens and closes over the entry opening;

a track disposed horizontally; and a motor having an engagement mechanism, wherein the engagement mechanism in engaged to the track, wherein the motor drives the door panel horizontally over the entry opening; and a bracket attached to the door panel, wherein the bracket comprises a mount and an extending flange, wherein the mount connects to a first side of the door panel and wherein the extending flange is rotatably connected to the mount on a first end and rotatably connected to an arm on a second end a length away from the door panel, the arm connected to the motor.

2. The automatic door moving system of claim 1 wherein the bracket is a singular rigid piece having a first end and a second end, wherein the first end of the bracket connects to a first side of the door panel and further wherein the second end of the bracket connects to the motor a length away from the door panel.

3. The automatic door moving system of claim 2 wherein the extending flange comprises a bend between the first end and the second end, and further wherein the bend curves towards the door panel.

4. The automatic door moving system of claim 1 wherein the extending flange is U-shaped.

5. The automatic door moving system of claim 1 further comprising a first ramp disposed on the first side of the entry opening, wherein the extending flange rotates in a first direction when the extending flange contacts the first ramp.

6. The automatic door moving system of claim 5 further comprising a second ramp disposed on the second side of the entry opening, wherein the extending flange rotates in a second direction when the extending flange contacts the second ramp.

7. The automatic door moving system of claim 1 further comprising at least one floor guide, wherein the at least one floor guide optimizes the alignment of the horizontally-moving door panel.

* * * * *